US010362357B1

(12) United States Patent
Bates et al.

(10) Patent No.: US 10,362,357 B1
(45) Date of Patent: Jul. 23, 2019

(54) SYSTEMS AND METHODS FOR RESUMING MEDIA IN DIFFERENT MODES OF PLAYBACK BASED ON ATTRIBUTES OF A PHYSICAL ENVIRONMENT

(71) Applicant: ROVI Guides, Inc., San Jose, CA (US)

(72) Inventors: Adam Bates, Los Gatos, CA (US); Jesse F. Patterson, Pacifica, CA (US); Mark K. Berner, Santa Clara, CA (US); Eric Dorsey, Palo Alto, CA (US); Jonathan A. Logan, Mountain View, CA (US); David W. Chamberlin, Pacifica, CA (US); Paul Stevens, Felton, CA (US); Herbert A. Waterman, Merced, CA (US); William L. Thomas, Evergreen, CO (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 15/857,051

(22) Filed: Dec. 28, 2017

(51) Int. Cl.
H04H 60/45 (2008.01)
H04N 21/442 (2011.01)
(Continued)

(52) U.S. Cl.
CPC ... H04N 21/44218 (2013.01); H04N 21/4302 (2013.01); H04N 21/44222 (2013.01); H04N 21/6587 (2013.01)

(58) Field of Classification Search
CPC ......... H04N 21/44218; H04N 21/4302; H04N 21/44222; H04N 21/6587
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

EP 1796389 6/2007
EP 2891952 7/2015
(Continued)

OTHER PUBLICATIONS

U.S. Appl. No. 15/674,281, filed Aug. 10, 2017, Waterman.
PCT International Search Report for International Application No. PCT/US2018/039420, dated Aug. 28, 2018 (14 Pages).

Primary Examiner — Mulugeta Mengesha
(74) Attorney, Agent, or Firm — Haley Guiliano LLP

(57) ABSTRACT

Systems and methods are described for resuming media in different modes of playback, based on attributes of a physical environment that a user has moved to. For example, a user may access a media asset (e.g., television broadcast of a baseball game) in a first environment (e.g., a living room). A media guidance application may then determine that the user has left the first environment. In response, the media guidance application may identify the user's new environment (e.g., a car) and analyze characteristics of the new environment. Based on the characteristics, the media guidance application may determine a suitable mode of playback (e.g., an audio version featuring play-by-play commentary of the baseball game on the car's radio) that the user can access from the playback position from where the user left off at the first environment.

18 Claims, 12 Drawing Sheets

(51) Int. Cl.
*H04N 21/43* (2011.01)
*H04N 21/6587* (2011.01)

(56) References Cited

U.S. PATENT DOCUMENTS

| | | |
|---|---|---|
| 7,103,906 B1 | 9/2006 | Katz et al. |
| 7,165,098 B1 | 1/2007 | Boyer et al. |
| 7,650,621 B2 | 1/2010 | Thomas et al. |
| 7,761,892 B2 | 7/2010 | Ellis et al. |
| 8,046,801 B2 | 10/2011 | Ellis et al. |
| 8,880,648 B1 * | 11/2014 | Arora ................ H04N 21/4126 709/218 |
| 2002/0174430 A1 | 11/2002 | Ellis et al. |
| 2005/0251827 A1 | 11/2005 | Ellis et al. |
| 2010/0153885 A1 | 6/2010 | Yates |
| 2015/0281252 A1 * | 10/2015 | Melcher ................ G06T 11/206 726/4 |
| 2016/0077710 A1 * | 3/2016 | Lewis ................ G06F 3/04842 715/716 |

FOREIGN PATENT DOCUMENTS

| | | |
|---|---|---|
| EP | 2905967 | 8/2015 |
| EP | 2950550 | 12/2015 |

\* cited by examiner

SYSTEMS AND METHODS FOR RESUMING MEDIA IN DIFFERENT MODES OF PLAYBACK BASED ON ATTRIBUTES OF A PHYSICAL ENVIRONMENT

BACKGROUND

Continuity is an important aspect of consuming media. In the related art, a user may stop accessing a media asset on a first device and may continue accessing on a second device, at a playback position where he/she left off. However, the related art does not select a second device or version of the media asset that is appropriate for playback, based on the environment the user is in. For example, the related art may cause the user to continue watching a baseball game on a mobile device even if the user is driving a car. The related art does not consider resumption on a device not specified by a user and does not select a playback format for such a device, based on attributes of the related environment.

SUMMARY

Systems and methods are thus described that address these issues by resuming media in different modes of playback, based on attributes of a physical environment that a user has moved to. Suppose that the user is viewing a baseball game on a television that is connected to a set-top box. The media guidance application may detect, using motion sensors, that the user is in his/her living room. The media guidance application may additionally detect that the user is leaving the living room and entering his/her car. In response, the media guidance application may determine the playback position of the baseball game on the set-top box and may identify whether the user is a passenger or driver using motion sensors. Depending on what the user is doing in the car, the media guidance application may identify various modes of playback that the user has access to. For example, if the user is a driver, the media guidance application may determine that the car stereo system is an appropriate mode of playback, as video would distract the driver and create unsafe driving conditions. If the user is a passenger, the media guidance application may determine that, in addition to the car stereo system, the user can access a video component of the baseball game on his/her smartphone. Upon determining a mode of playback, the media guidance application may select a version of the media that is compatible with the mode of playback. For example, the car stereo system may be compatible with audio only. The media guidance application may then continue playback of the baseball game, from the playback position where he/she left off in the living room, in an audio version featuring play-by-play commentary.

In some aspects, the media guidance application may generate for presentation a media asset for a first user in a first physical environment. The media asset may be an electronically consumable user asset such as television programming, on-demand programs, Internet content, video clips, audio, multimedia, etc. The first physical environment represents the user's initial location. For example, the media guidance application may be displaying the music video "Adventure of a Lifetime by Coldplay" through the user's smartphone in the first physical environment, the user's home.

The media guidance application may collect data from sensor circuitry representing a location of the first user. Collecting the data may comprise accessing at least one of global positioning information of a mobile device associated with the first user, calendar information associated with the first user, network connection information of a mobile device associated with the first user, and social media associated with the first user. For example, the user may be accessing a mobile device with information about positioning, network connections, and a user profile. The positioning information may allow the media guidance application to determine global positioning coordinates associated with the user and classify the user's location (e.g., home, office, gym, etc.) from the coordinates.

In terms of network connection information, the media guidance application may determine the location of the user based on the Wi-fi connection of the user (e.g., home Wi-fi, office Wi-fi, public Wi-fi, etc.) This may be more robust if the user has Wi-fi extenders. For example, if the user is in the basement and the main router is on the second floor, the user may opt to connect his/her mobile device to a Wi-fi extender located in the basement. As a result, the media guidance application may determine that the user is located in the basement because he/she is connected to the basement Wi-fi extender. Network connection strength can also be used by the media guidance application to estimate the user's approximate distance from the network connection source. For example, if the user's Wi-fi connection strength is poor (e.g., mobile device receiving only 10% of the signal outputted from the router), the media guidance application may estimate that the user is a large distance away from the router (e.g., at least 50 feet away). Similarly, if the network connection between a cell tower and the user's mobile device is poor, the media guidance application may determine that the user is a large distance away from the location of the cell tower.

In terms of user profile information, the media guidance application may track events that the user is participating in. For example, the media guidance application may access the user's calendar information and detect that the user will be at a friend's house between 2:00 pm and 5:00 pm. The media guidance application may estimate, using resources such as Google Maps, that the user will need to commute to the friend's house for one hour. Accordingly, the media guidance application may determine that from 1:00 pm to 2:00 pm, the user's location may be in the user's car and from 2:00 pm to 5:00 pm, the user will be at the friend's house. Likewise, the media guidance application may access posts, event descriptions, and messages on social media that are associated with the user to anticipate the user's location. For example, the user's Facebook events may indicate that the user is attending an event at the friend's house at 6:00 pm. As a result, the media guidance application may determine that the location of the user will be the friend's house at 6:00 pm.

In some cases, the user may not have access to a mobile device. Thus, other types of sensor circuitry may be utilized. These sensors may include, but are not limited to, video sensors, audio sensors, and motion sensors. The media guidance application may communicate with the sensors through a Bluetooth or Wi-fi connection. For example, the media guidance application may use a video sensor (e.g., a security camera) to potentially capture images at the first physical environment. The video sensors may be placed in parts of an environment that allow the sensor to capture an image of the entire environment. The media guidance application may then utilize computer vision techniques such as segmentation, to classify if a person (e.g., the user) appears in the image. In some cases, audio sensors may be utilized to capture audio. The media guidance application may analyze the audio using natural language processing (e.g., voice recognition); if the media guidance application detects the user's voice from an audio sensor in the first physical environment, the media guidance application may determine that the user is in the first physical environment. In the case of motion sensors, the media guidance application may count the number of individuals in an environment based on who enters or leaves. For example, if the motion sensor is placed in the doorway of a living room, the media guidance application may increment the number of individuals in the living room whenever motion is detected of an object entering the living room. Likewise, the media guidance application may decrement the number of individuals in the living room whenever motion is detected of the object moving in the opposite direction.

The media guidance application may track the sensors and network connections in a locations database. The locations database may list entries of all sensors and network connections associated with the first user. For each entry, a corresponding physical environment may be listed. For example, if the user's motion sensor is in the user's bedroom and the motion sensor detects the first user, the media guidance application may determine that the motion sensor corresponds to the user's bedroom; therefore, the user is in the bedroom.

The media guidance application may process the collected data to determine that the location of the first user has changed from the first physical environment to a second physical environment, indicating that the first user has left the first physical environment and has entered the second physical environment. For example, the media guidance application may use any combination of sensors and network connections to determine the location of the user. Suppose that the user's mobile device is connected to the user's "home Wi-fi." Accordingly, the media guidance application may refer to the locations database and determine that the user is in a first physical environment, home, because "home Wi-fi" corresponds to home. The user may then exit the first physical environment and enter his/her car, causing the user's mobile device to disconnect with "home Wi-fi." Furthermore, suppose that the user connects to the car's speaker system using Bluetooth. The media guidance application may determine that the Bluetooth connection is associated with the car's speaker system and classify the user's location as inside the user's car, based on the locations database. The car's speaker system may also have access to the Internet. In this case, the speaker system's activation alone may inform the media guidance application that the user has entered the car. The media guidance application may thus recognize the car as the second physical environment.

In response to determining that the location of the first user has changed, the media guidance application may identify a playback position of the media asset that was generated for presentation when the first user left the first physical environment. Upon determining that the first user has exited the first physical environment, the media guidance application may store the playback position of the media asset in a viewing history database, which may be stored in a remote server. The media guidance application may also track the playback position of the media asset as the user accesses the media asset, and store the playback position in the viewing history database in real time. In some embodiments, the media guidance application may store the playback position in response to determining that the user has paused the media asset or is no longer accessing the media asset at the first device. In response, the media guidance application may determine whether the user has left the first physical environment using sensor circuitry. The viewing history database may store the names of the media assets that various users have accessed, the devices the users used to access the media asset, the environments the users were in during access, and the last positions where the users left off. For example, if the user left the first physical environment when the media asset "Adventure of a Lifetime by Coldplay" reached the playback position 0:02:32 (e.g., 2 minutes and 32 seconds from the start of the music video), the media guidance application may upload the position 0:02:32 onto the remote server and store it in the viewing history database. In response to the user entering the second physical environment, the media guidance application may refer to the viewing history database and download the playback position from the remote server.

The media guidance application may determine an attribute of the second physical environment. The attribute of the second physical environment can be a set of unique configurations that the media guidance application may detect. These configurations may include, but are not limited to, the number of individuals in the environment (e.g., group of fifty people), the interaction between the user and the environment (e.g., user driving a car), the type of environment (e.g., quiet library), social occasion (e.g., party), the network quality (e.g., Wi-fi signal quality) and the devices in the environment (e.g., television). Following the example from above, a first user enters a car. Using sensor circuitry, information from the locations database associated with the second physical environment, information in the user profile, and by identifying the devices in the second physical environment, the media guidance application may create a set of configurations that are identified as the attribute. In this example, the configurations may indicate the media streaming services the user is subscribed to (e.g., Netflix, Spotify, etc.), the devices in the second physical environment (e.g., user's mobile device, car's speaker system, etc.) and the number of people in the second physical environment.

The media guidance application may search a database, based on the attribute, to identify a first plurality of modes of playback associated with the attribute. The locations database may include a table for each environment with various configurations. Each configuration may be associated with a plurality of modes of playback. The plurality of modes of playback may include devices (e.g., mobile device, laptop, car's speaker system, etc.) and media streaming/playing services (e.g., Netflix, Audible, etc.) that can be used to play back a media asset. Suppose that the locations database has a table dedicated to configurations associated with the user's car. The media guidance application may compare the set of configurations described in the attribute with the configurations in the table. Initially, all modes associated with a car may be enabled for recommendation. For example, the modes may be predetermined by the media guidance application and may include all possible devices and services that can be used when a user is in a car. The table of configurations may then serve as a checklist. For example, one configuration that is linked to visual devices may ask "is the user driving?" If the attribute indicates that the user is driving, the media guidance application may disable, for recommendation, all devices that require the user to rely on visuals (e.g., to avoid distracting the user from the road). Another configuration that is linked to an audiobook streaming service (e.g., Audible) may ask "is the user subscribed to Audible?" If the attribute indicates that the user is not subscribed to Audible, the media guidance application may disable, for recommendation, Audible as a source for playback. Another configuration may ask "are bandwidth conditions poor?" For example, the media guidance application may determine the bandwidth conditions of the user (e.g., 2 Mbps) in the second physical environment and determine whether the user meets a minimal bandwidth threshold to access the media asset through the first plurality of modes. For example, the media guidance application may refer to the locations database to determine the minimum bandwidth threshold to access a media asset on Netflix in standard quality (e.g., 3 Mbps). In response to determining that the bandwidth condition of the user (e.g., 2 Mbps) is less than the minimum bandwidth threshold to access a media asset on Netflix in standard quality, the media guidance application may determine that the user cannot access a media asset on Netflix and may remove (e.g., not recommend) the mode from the first plurality of modes. The remaining modes in the plurality of modes should therefore run under the bandwidth conditions of the user in the second physical environment. In response to the media guidance application comparing all configurations with the attribute, the media guidance application may determine a plurality of modes that are appropriate for accessing a media asset, based on the attribute of the second physical environment. Suppose that the media guidance application identifies the car's speaker system as a device that is appropriate for accessing the media asset. The first plurality of modes may thus only feature services that are compatible with the car's speaker system (e.g., audio-based services) such as Netflix, Google Play Video, and Spotify.

In some embodiments, the media guidance application searching the database, based on the attribute, to identify the first plurality of modes of playback associated with the attribute comprises determining an environment type of the second physical environment. The environment type (also referred to as type of environment) may be a general description of the environment and may be determined based on entries from the locations database. For example, the locations database may list an environment as the "Statue of Liberty," and the respective environment type may be "landmark." Similarly, the environment may be the "Metropolitan Museum of Art" and the environment type may be "museum." By generalizing the environment into an environment type, the media guidance application may be able to infer additional characteristics of the environment. For example, an environment type of "museum" may be associated with noise restrictions, which may affect the mode of playback the media guidance application identifies.

The media guidance application may then determine a plurality of candidate roles associated with the environment type. For example, the media guidance application may determine that the user is sitting in a vehicle such as a 2017 Nissan sedan. The environment type may therefore be a car. The media guidance application may refer to the locations database to determine that there are two roles that can be associated with a car, driver and passenger. The media guidance application may determine a first role, of the plurality of candidate roles, of the first user, by determining, based on data from the sensor circuitry, that the first user is in a first physical space within the second physical environment. For example, a video sensor may be placed on the deck of the car, beside the front windshield. The media guidance application may collect the video stream from the video sensor and divide the frame of each video into various partitions. For simplicity, suppose that the media guidance application divides each frame into three partitions, a top portion focusing on the area of the backseat, a bottom left portion focusing on the front passenger seat, and a bottom right portion focusing on the driver seat. Using computer vision (e.g., facial recognition, segmentation, edge detection, etc.), the media guidance application may determine that the user is in the bottom right portion. As a result, the media guidance application may determine that the user is in a first physical space, the driver seat.

The media guidance application may compare the first physical space to a plurality of physical space templates, wherein each physical space template is associated with a role of the plurality of candidate roles. For example, the media guidance application may refer to a space characteristics database, which features characteristics (e.g., images, audio clips, names, etc.) associated with entries of various physical spaces. Each entry may additionally be classified by a role for users in the area. For example, the space characteristics database may feature images of unique driver seats associated with a first role "driver." The media guidance application may compare the image from the video sensor with the image in the space characteristics database to determine that the user is a driver. In response to determining that the first physical space matches the first physical space template (e.g., image of a driver seat) corresponding to the first role (e.g., driver), the media guidance application may identify the first plurality of modes of playback associated with the first role. For example, the media guidance application may refer to the locations database and identify the user as a driver in the configuration of the second physical environment. As a result, the plurality of modes determined by the media guidance application take the first role into account.

In some embodiments, the media guidance application may detect that a second user is present at the second physical environment with the first user. For example, the media guidance application may collect data from sensor circuitry through a wired or wireless connection. Suppose that the sensor circuitry is a video sensor that sends information to the user's mobile device using a communication radio module (e.g., Xbee radio). The video sensor may capture an image that is further analyzed by the media guidance application on the user's mobile device. Using image processing, the media guidance application may determine that the second physical environment (e.g., the car) features a second user. The media guidance application may then determine a second role, of the plurality of candidate roles, of the second user, wherein the second role is different from the first role. Using the process described previously, the media guidance application may determine that the second user is in the bottom left region of the video stream of the video sensor (e.g., focused on the passenger seat). Based on the space characteristics database, the media guidance application may determine that the second user has a second role "passenger."

The media guidance application may identify a second mode of playback that corresponds to the second role, wherein the second mode of playback includes playback using an output that is also used by the first mode and additionally includes an output that is not used by the first mode. For example, the first mode, which is associated with the first role "driver" may comprise a music streaming service (e.g., Spotify) on the car's speaker system. In contrast, because the second role "passenger" does not require the second user to focus on the road, the second mode may comprise the second user's mobile device, along with the car's speaker system. When generating the presentation of the media asset, the media guidance application may select the second user's mobile device as the mode of playback. It should be noted that the media guidance application may also separately consider the second user's accessibility to various modes of playback. For example, the second user may not have access to a music streaming service, such as Spotify, while the first user may have access. In response, the media guidance application may still identify Spotify on the car's speaker system as a mode of playback because at least one of the users has access to the mode. It should also be noted that the second user may be accessing a different media asset that the second user left off at.

The media guidance application may compare a plurality of versions of the media asset with the identified first plurality of modes to identify a first version of the media asset that corresponds to a first mode. The media guidance application may then determine the different versions that the media asset is available in by referring to the Internet. For example, the media guidance application may determine that "Adventure of a Lifetime by Coldplay" is available as a music video, a song, and lyrics. Since the first plurality of modes are services compatible with the car's speaker system, the media guidance application may determine that only the song version corresponds to the plurality of modes. Therefore, the media guidance application may select the song, which corresponds to the mode "Spotify on the car's speaker system."

In some embodiments, the media guidance application may identify that the second user is a child (e.g., via computer vision, retrieved user profiles, etc.). In response, the media guidance application may determine whether parental controls need to be implemented. For example, at the first physical environment, the first user may be listening to an explicit song. The first user may then enter the second physical environment where a second user (e.g., a child) is present. The media guidance application may identify the child and retrieve user profiles associated with the first user and second user to search for parental locks. Suppose that the first user is the parent of the second user and has requested parental locks. In response to identifying the second user as a child that is associated with parental locks, the media guidance application may recommend only modes of playback that feature a clean (e.g., non-explicit) version of the song.

The media guidance application may then generate a presentation of the media asset at the second physical environment in the identified first version starting from the identified playback position. For example, the media guidance application may retrieve the playback position, 0:02:32, from the viewing history database. Since the user has connected his/her mobile device to the car's speaker system through a Bluetooth connection, the media guidance application may continue playback of "Adventure of a Lifetime by Coldplay" on the user's mobile device from the playback position using Spotify.

In some embodiments, the media guidance application may retrieve a priority level associated with each of the identified modes. For example, the media guidance application may refer to the first user's user profile to determine mode preferences. Suppose that the first user is a passenger in the car. The media guidance application may identify two modes that the user can use to access the media asset. The first mode may be an online video streaming application (e.g., YouTube) on the user's mobile device. As previously mentioned, the car's speaker system may also be able to connect to the Internet directly and retrieve media assets from audio-based services. The media guidance application may thus determine the second mode to be a music streaming service (e.g., Spotify) on the car's speaker system. The media guidance application may determine that the first version of the media asset, the music video "Adventure of a Lifetime by Coldplay," corresponds to the first mode and that a second version of the media asset, the audio-only song, corresponds to the second mode. The media guidance application may then select the first version as the identified version in response to determining that a priority level associated with the first mode is greater than a priority level associated with the second mode. For example, the user profile of the first user may indicate rankings of various modes based on the user's preference. The user may rank video-centric modes (e.g., video on a display) over audio-centric modes (e.g., no visuals).

In some embodiments, the media guidance application may retrieve a social interaction level associated with each of the identified modes. For example, the locations database may further provide information about the modes associated with the environments, detailing a social interaction level. The social interaction level represents the amount of people the mode may engage. For example, the mode consisting of a service being utilized on a mobile device may engage only a single user in an environment such as a car. In contrast, the mode of an audio-centric service on a car's speaker system may engage all users in the car. The media guidance application may determine that the first version of the media asset, the music video "Adventure of a Lifetime by Coldplay," corresponds to the first mode and that a second version of the media asset, the song, corresponds to the second mode. The media guidance application may select the second version as the identified version, in response to determining that the social interaction level associated with the second mode is greater than the social interaction level associated with the first mode. For example, suppose that multiple users are present in the car. Rather than presenting the media asset on the mobile device as a music video, the media guidance application may identify, using sensor circuitry, that multiple users are in the car and may present the media asset as a song, so that all users can listen.

In some embodiments, the first mode presents content using a single device configured to output audio only, wherein a second mode of the modes presents content using multiple types of devices simultaneously, and wherein generating for presentation the media asset in the second physical environment comprises generating a display of the media asset on a display device and outputting audio of the media asset via a separate audio output device. For example, the first mode may be using Spotify through the car's speaker system to present an audio only output of "Adventure of a Lifetime by Coldplay" (e.g., the song). The second mode may be using YouTube through both the user's mobile device and the car's speaker system. In this case, the user may be able to view the music video on the mobile device display and listen to the audio portion of the music video through the car's speaker system. The media guidance application may rely on a wired (e.g., auxiliary audio cable) or wireless connection (e.g., Bluetooth) to split the video and audio streams of the media asset amongst the modes. Assuming the car's speaker system can independently access the Internet, the media guidance application on both devices may also retrieve the playback position from the viewing history database and begin playback on both devices synchronously. In the case where the versions of the media assets differ, the media guidance application may perform audio processing to synchronize the playback positions of the media asset. For example, the audio of the music video version of "Adventure of a Lifetime by Coldplay"

may differ from the audio of the song version of the "Adventure of a Lifetime by Coldplay." These differences may include additional sounds, or the addition of a preamble to the music video. The media guidance application may process the audio by matching sections with the same frequency and temporal characteristics. Given that the user was accessing the music video version in the first physical environment, the media guidance application may identify a second playback position in the song version with audio content that matches the frequency and temporal characteristics of the audio content at the first playback position (e.g., the playback position stored upon the user's exit from the first physical environment).

In some embodiments, the media guidance application may receive user input classifying the second physical environment. In the cases where the media guidance application cannot identify the second physical environment, the media guidance application may request the user to classify the user's environment. For example, the media guidance application may identify a device the user is accessing, such as the user's mobile device, and present the request on the user's display. Suppose that the user indicates that he/she is at a library. The media guidance application may identify a social occasion at the second physical environment, wherein the social occasion represents an activity that the user is participating in. For example, the media guidance application may refer to the user's calendar in the user profile to determine whether the user is participating in a social occasion. The media guidance application may also refer to the user's social media to determine any social occasions associated with the user as mentioned in messages, comments, events pages, and posts. Suppose that the media guidance application determines that the user is reading. In response, the media guidance application may identify a plurality of devices, associated with the social occasion, that is available at the second physical environment. For example, the media guidance application may emit, from the user's device, a discovery message to identify devices that are in the second physical environment. The media guidance application may request device identification (ID) from the devices in a broadcast message (e.g., via Bluetooth). Upon receiving replies from the devices in the second physical environment, the media guidance application may refer to a device database, which may feature device lookup information, to determine the name (e.g., MacBook), device type (e.g., laptop computer) and compatible media services/sources (e.g., Netflix, Spotify, etc.) associated with each device ID. Upon determining the available devices, the media guidance application may identify a plurality of devices that are associated with the social occasion, by determining statuses of the relevant configurations in the location database (e.g., "is the device loud?", "is the device compatible with headphones?", etc.). For example, because the library may have noise restrictions, the media guidance application may identify a plurality of devices that is appropriately configured for a quiet environment (e.g., features devices that are not noisy and/or are compatible with headphones).

Suppose that two users are in the second physical environment and the first user of the two previously accessed the latest episode of "Game of Thrones" on his set-top box in the first physical environment. In some embodiments, the media guidance application may detect a second user in the second physical environment. For example, the media guidance application may collect data from sensor circuitry through a wired or wireless connection. Suppose that the sensor circuitry is a video sensor that sends information to the user's mobile device using a communications radio module (e.g., an Xbee radio). The video sensor may capture an image that is further analyzed by the media guidance application on the user's mobile device. Using image processing, the media guidance application may determine that the second physical environment has two individual users. The media guidance application may further identify the second user through facial recognition or voice recognition. The media guidance application may then access a viewing history of the second user. For example, the media guidance application may refer to the viewing history database on the remote server and retrieve the viewing history of the second user. In response to determining that the second user has not viewed the media asset based on the viewing history, the media guidance application may identify a first device that is not perceptible to the second user. For example, the media guidance application may determine that the latest episode of "Game of Thrones" is not in the viewing history of the second user. In order to prevent spoilers for the second user, the media guidance application may identify a device in the second physical environment that is not perceptible to the second user. For example, the media guidance application may identify the first user's mobile device as a device that the second user cannot see/hear and only the first user may access. Furthermore, to ensure that the second user cannot view the media asset, the media guidance application may select the first device to be the mobile device inserted in a virtual reality headset (e.g., Google Daydream). Identifying a device that is not perceptible specifically to the second user prevents solely the second user from viewing the media asset. Therefore, if additional users who have viewed the media asset and are not affected by spoilers, enter the physical environment, the additional users are not prevented from viewing alongside the first user.

In some embodiments, the media guidance application may determine, while the media asset is presented on the first device, that the second user has reached a current playback position in the media asset. Suppose that the second user begins watching the latest episode of "Game of Thrones" and the first user does not continue watching from the playback position. It is possible that the second user may reach the playback position that the first user left off at. In response to determining that the second user has reached the current play position in the media asset being presented, the media guidance application may identify a second device that is perceptible to the first user and the second user. For example, the media guidance application may identify that the second physical environment features a smart television that the first and second user can view together. The media guidance application may then generate the presentation of the media asset on the second device. In some embodiments, generating the presentation of the media asset on the second device comprises changing the identified version from the first version of the media asset that corresponds to the first mode associated with the first device (e.g., a virtual reality video on the Google Daydream), to a second version of the media asset that corresponds to a second mode associated with the second device (e.g., video on the smart television).

In some embodiments, the media guidance application may refer to the user profile to retrieve a playlist that the user is accessing, or the user's viewing history. For example, the user may be watching episodes of a television show, such as Game of Thrones, continuously. In response to determining that the user has entered the second physical environment, the media guidance application may retrieve the playlist of Game of Thrones episodes the user is watching, and identify a suitable mode of playback that allows the user to continue accessing the media assets in the playlist. For example, when identifying the suitable mode of playback, the media guidance application may either retrieve the playlist the user is accessing or refer to the user's viewing history to determine the likelihood (e.g., where viewing times and frequency are used as functions of probability algorithms) that the user will access the next episode of Game of Thrones. The media guidance application may compare the likelihood to a threshold which represents the minimum probability of the user accessing the next media asset. In response to determining that the likelihood exceeds the threshold, the media guidance application may play the next media asset (e.g., next episode) via a suitable mode of playback in the second physical environment.

In summary, the media guidance application may play a media asset for a user in a first physical environment. Suppose that the media asset is the music video "Adventure of a Lifetime by Coldplay" being played on the user's mobile device and the first physical environment is the user's home. The media guidance application may then determine that the user has left the first physical environment and has entered a second physical environment. For example, the media guidance application may collect network connection information such as the Wi-fi connection of the mobile device and sensor data from motion sensors to determine that the user has exited his/her home and has entered a car. The media guidance application may also identify a play position of the media asset that was playing when the user left the first physical environment. Accordingly, if the user stopped viewing the music video at the 2-minute mark from when it began, the media guidance application may store the playback position in a viewing history database that tracks the media assets the user has viewed and the positions where the user stopped viewing the respective media assets.

In response to determining that the user has entered the second physical environment, the media guidance application may then determine attributes of the second physical environment. For example, the media guidance application may identify attributes such as the number of people, the size, the user's role, the devices, network connection capabilities, etc. that are associated with the second physical environment. Based on the attributes, the media guidance application may identify a mode of playback corresponding to the second physical environment. Suppose that the user is driving a car. As a result, the media guidance application may select a music streaming service (e.g., Spotify) via the car's speaker system as a mode of playback. The media guidance application may then determine whether a version of the media asset corresponding to the identified mode of playback is available. For example, the media guidance application may search for a song version of "Adventure of a Lifetime by Coldplay" on Spotify.

In response to determining that the version of the media asset corresponding to the identified mode of playback is available, the media guidance application may play the version of the media asset corresponding to the identified mode of playback to the user starting from the playback position (e.g., the 2-minute mark from where the user left off the music video).

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for resuming media in different modes of playback, based on attributes of a physical environment that a user has moved to. Suppose that the user is viewing a baseball game on a television that is connected to a set-top box. The media guidance application may detect, using motion sensors, that the user is in his/her living room. The media guidance application may additionally detect that the user is leaving the living room and entering his/her car. In response, the media guidance application may determine the playback position of the baseball game on the set-top box and may identify whether the user is a passenger or driver using motion sensors. Depending on what the user is doing in the car, the media guidance application may identify various modes of playback that the user has access to. For example, if the user is a driver, the media guidance application may determine that the car stereo system is an appropriate mode of playback, as video would distract the driver and create unsafe driving conditions. If the user is a passenger, the media guidance application may determine that in addition to the car stereo system, the user can access a video component of the baseball game on his/her smartphone. Upon determining a mode of playback, the media guidance application may select a version of the media that is compatible with the mode of playback. For example, the car stereo system may be compatible with audio only. The media guidance application may then continue playback of the baseball game, from the playback position that the user left off at in the living room, in an audio version featuring play-by-play commentary.

Figure 1:
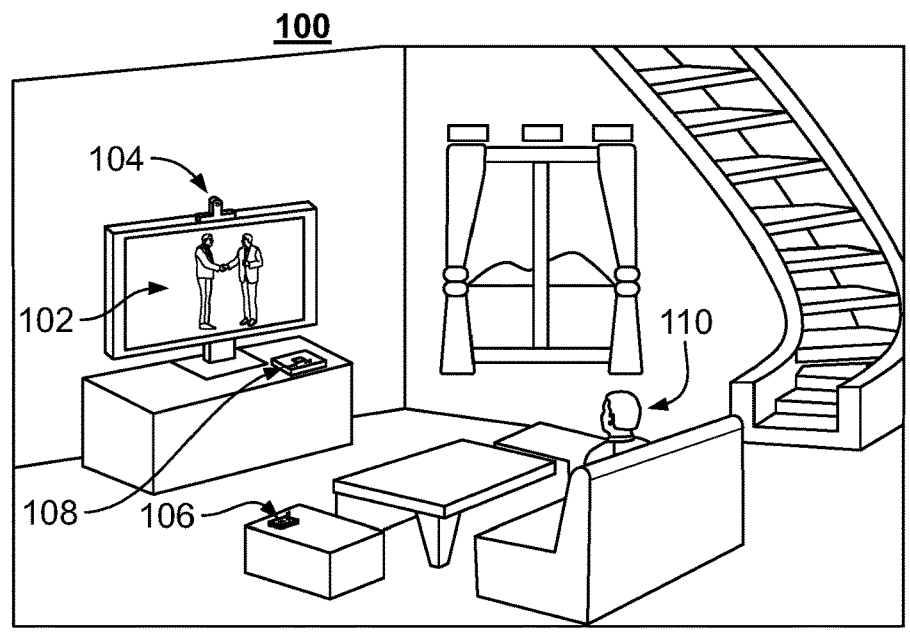
FIGS. 1 and 2 show illustrative examples of scenarios for resuming media in different modes of playback based on attributes of a physical environment where the media is being resumed, in accordance with some embodiments of the disclosure.
Figure 2:
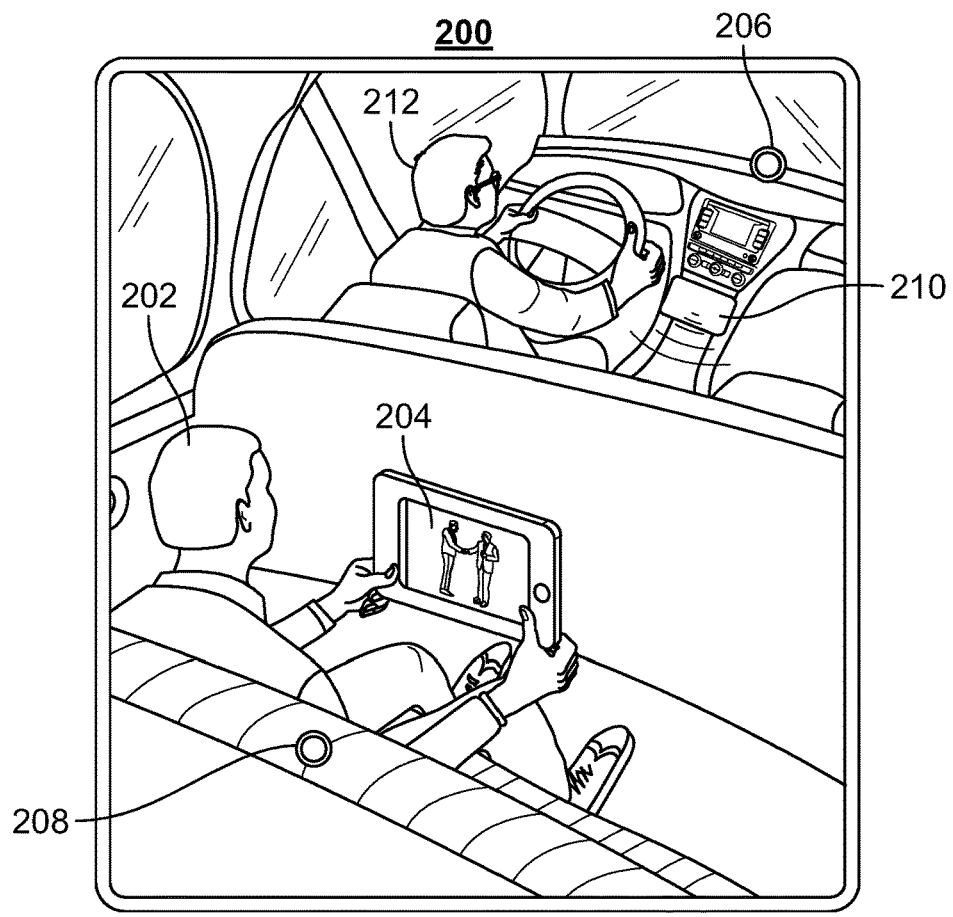

FIGS. 1 and 2 show illustrative examples of scenarios for resuming media in different modes of playback based on attributes of a physical environment where the media is being resumed, in accordance with some embodiments of the disclosure. The media guidance application may be executed by control circuitry on user equipment 108, user 202's user equipment 204, or secondary user equipment 210, on a remote server, or a combination of the two, as will be described with respect to FIGS. 3-6.

First physical environment 100 may be any environment where a user is initially located. In this case, first physical environment 100 is user 110's home, in which user 110 is accessing a media asset. In this scenario, the media guidance application presents the media asset, an episode of "Game of Thrones," on display 102 through user equipment 108 (e.g., a set-top box). The media asset may be an electronically consumable user asset such as television programming, on-demand programs, Internet content, video clips, audio, multimedia, etc. The version of the media asset in this specific scenario may be a video.

The media guidance application may collect data from sensor circuitry representing a location of the first user, user 110. Sensor 104 may be, but is not limited to, video sensors, audio sensors, motion sensors, three-dimensional scanners, light sensors, and/or thermographic sensors. In some cases, sensor 104 may be a device that includes multiple tracking components such as a smartphone (e.g., includes a camera, a microphone, a gyroscope, etc.). Accordingly, in some embodiments, sensor 104 may be a cell phone, a webcam installed on the television, a microphone, a security camera, a laser tracker, etc. In this scenario, sensor 104 may represent a Microsoft Kinect, which is a motion sensor that captures video streams and is capable of identifying objects in the stream. Sensor 104 provides the media guidance application with information about user 110's location. Sensor 104 may be connected through a wired (e.g., USB) or wireless (e.g., Wi-fi) connection to user equipment 108 (e.g., a set-top box). For example, the Microsoft Kinect may be connected to the set-top box. Both devices may communicate with each other such that the set-top box sends requests for video streams to the Microsoft Kinect, and the Microsoft Kinect responds by sending the requested video streams to the set-top box. The media guidance application on user equipment 108 may then analyze the video stream to determine whether user 110 is in the first physical environment. The media guidance application may utilize image processing to identify objects in each video frame of the video stream. If the media guidance application classifies an object in a video stream to be user 110, the media guidance application may determine that user 110 is in first physical environment 100.

In some cases, sensor 104 may be an audio sensor that captures sound information associated with the physical environment. The media guidance application may analyze the audio using natural language processing (e.g., voice recognition). Additionally, the media guidance application may detect other noises to identify user 110's location. For example, crowd noise may be associated with a stadium or concert, traffic noise may be associated with a car, sounds of water flowing may be associated with the beach, etc. The media guidance application may compare the audio detected to reference audio clips from the Internet. If the media guidance application detects user 110's voice from an audio sensor in first physical environment 100, the media guidance application may determine that user 110 is in first physical environment 100.

The media guidance application may also utilize network connection information to determine whether user 110 is in first physical environment 100. For example, the media guidance application may determine the location of user 110 based on the Wi-fi connection of user 110's smartphone (e.g., home Wi-fi, office Wi-fi, public Wi-fi, etc.). Network source 106 may be a router that user equipment 108 is connected to over a Wi-fi connection. It is also possible that user 110 owns a mobile device that is connected to network source 106. The media guidance application may identify all devices connected to network source 106 as devices located in first physical environment 100. Therefore, if the devices are being used by user 110, the media guidance application may determine that user 110 is in first physical environment 100 as well. Furthermore, network connection strength may be used by the media guidance application to estimate user 110's approximate distance from the network connection source. For example, if user 110's mobile device's Wi-fi connection strength is poor (e.g., mobile device receiving only 10% of the signal outputted from network source 106), the media guidance application may estimate that user 110 is a large distance away from network source 106 (e.g., at least 50 feet away). The media guidance application may refer to a networks algorithm to approximate the distance of user 110 from network source 106 as a function of signal strength at the source (e.g., router) and destination (e.g., the device user 110 is using to access the media asset). If user 110 has multiple routers (e.g., Wi-fi extenders), the media guidance application may use multiple signal strength determinations to triangulate the location of user 110.

In an environment that is indoors, the media guidance application may also retrieve information from indoor positioning systems to determine the specific room user 110 is in. This allows the media guidance application to determine a more suitable plurality of modes for playback that user 110 can access (e.g., the modes associated with a bedroom may be different from modes associated with a living room). In the case of motion sensors, the media guidance application may count the number of individuals in an environment based on who enters or leaves. For example, if the motion sensor is placed in the doorway of a living room, the media guidance application may increment the number of individuals in the living room whenever motion is detected of an object entering the living room. Likewise, the media guidance application may decrement the number of individuals in the living room whenever motion is detected of the object moving in the opposite direction (e.g., out of the living room). In an advanced model, the motion sensors may be replaced with video sensors that can identify the person entering and leaving an environment (e.g., via facial recognition), in addition to incrementing the count of people in a room. Based on the identity of the person, the media guidance application may identify a unique plurality of modes for playback.

The media guidance application may also utilize user profile information to track events that user 110 is participating in. For example, the media guidance application may access user 110's calendar information and detect that user 110 will be at a friend's house between 2:00 pm and 5:00 pm. The media guidance application may estimate, using resources such as Google Maps, that user 110 will need to commute to the friend's house for one hour. Accordingly, the media guidance application may determine that from 1:00 pm to 2:00 pm, user 110's location may be in a car and from 2:00 pm to 5:00 pm, user 110 will be at the friend's house. Likewise, the media guidance application may access posts, event descriptions, and messages on social media that are associated with user 110 to anticipate user 110's location. For example, the user's Facebook events may indicate that user 110 is attending an event at the friend's house at 6:00 pm. As a result, the media guidance application may determine that the location of user 110 will be the friend's house at 6:00 pm.

The media guidance application may track the sensors and network connections in a locations database. The locations database may list entries of all sensors and network connections associated with the first user, user 110. For each entry, a corresponding physical environment may be listed. For example, if sensor 104 (e.g., Microsoft Kinect) is in user 110's living room and sensor 104 detects the first user, user 110, the media guidance application may determine that sensor 104 corresponds to user 110's living room; therefore, user 110's first physical environment 100 is the living room.

The media guidance application may process the collected data to determine that the location of the first user, user 110, has changed from first physical environment 100 to a second physical environment, indicating that the first user, user 110, has left first physical environment 100 and has entered the second physical environment. For example, the media guidance application may use any combination of sensor 104 and network source 106 data to determine the location of user 110. Suppose that user 110's mobile device is connected to user 110's "home Wi-fi," which is outputted by network source 106. Accordingly, the media guidance application may refer to the locations database and determine that user 110 is in a first physical environment, home, because "home Wi-fi" corresponds to home. User 110 may then exit first physical environment 100 and enter a car, causing user 110's mobile device to disconnect with "home Wi-fi" (e.g., indicating that user 110 has left first physical environment 100). Similarly, the media guidance application may detect that user 110 is no longer detected in first physical environment 100 based on the video and/or audio data generated by sensor 104. For example, the media guidance application may determine, using image processing, that the video frames captured by sensor 104 no longer include user 110. In either case, the media guidance application may respond by retrieving global positioning data associated with the location of user 110's mobile device. The coordinates of the global positioning data may allow the media guidance application to identify user 110's new location.

Suppose that user 110 requests a taxi (e.g., via an application such as Uber) using his/her mobile device represented by user equipment 204. The media guidance application on the mobile device may detect that user 110 has requested a taxi by analyzing the content of user 110's screen. The media guidance application may capture a screenshot of user 110's screen and identify objects such as the Uber logo and parse any confirmation that user 110 will participate in an event associated with a second physical environment (e.g., confirmation that the requested Uber taxi, which is the second physical environment, will arrive in a given period of time). Based on the confirmation, the media guidance application may determine that user 110 has left first physical environment 100 and will enter the second physical environment.

In response to determining that the location of the first user, user 110, has changed, the media guidance application may identify a playback position of the media asset that was generated for presentation when the first user left first physical environment 100. Upon determining that the first user has exited first physical environment 100, the media guidance application may store the playback position of the media asset in a viewing history database, which may be stored on a remote server. In some embodiments, the media guidance application may also track the playback position of the media asset as user 110 accesses the media asset, and store the playback position in the viewing history database in real time. In some embodiments, the media guidance application may store the playback position in response determining that user 110 has paused the media asset. Additional features for storing playback position for resuming a media asset on a second device are described in greater detail in Katz et al., U.S. Pat. No. 7,103,906, filed Sep. 29, 2000, and Thomas et al., U.S. Pat. No. 7,650,621, granted Jan. 19, 2010, the disclosures of which are hereby incorporated by reference herein in their entireties.

The viewing history database may include the names of the media assets that various users have accessed, the devices the users used to access the media asset, the environments the users were in during access, and the last positions where the users left off. For example, if user 110 left first physical environment 100 when the media asset "Game of Thrones" reached the playback position 0:05:32 (e.g., 5 minutes and 32 seconds from the start of an episode), the media guidance application may upload the position 0:05:32 onto the remote server and store it in the viewing history database. In response to user 110 entering the second physical environment, the media guidance application may refer to the viewing history database and download the playback position from the remote server.

In this case, the remote server can be any device that provides a service, such as file retrieval, for a client, such as user 110's local device. Furthermore, the remote server can be connected to user 110's local area network (LAN) as a remote access server (RAS), or may be a part of the local area network itself (e.g., LAN server). For example, the server can be a computer in a LAN network, a database server that processes database queries, a cloud server that provides services on demand over the Internet, a dedicated file server that stores files, or any device that can provide services to a client device remotely. The media guidance application first identifies servers that can communicate with the media guidance application (e.g., transfer files, send delivery messages etc.). The media guidance application then determines whether the media asset's playback position associated with user 110 is on the server. If the playback position is in the viewing history database on the server, the media guidance application may retrieve the playback position when user 110 enters the second physical environment and/or wishes to continue accessing the media asset from where he/she left off.

In FIG. 2, second physical environment 200 (e.g., inside the Uber taxi) is the environment that user 202 (previously identified as user 110) has moved to. User equipment 204 (e.g., smartphone, tablet, laptop, etc.) represents a device that is associated with user 202. In order for the media guidance application to determine whether user 202 is in second physical environment 200, the media guidance application may rely on sensor 206 and sensor 208, which both may be video sensors (e.g., security cameras). The media guidance application may first emit, from user equipment 204, a discovery message to identify devices and sensors that are in second physical environment 200. The media guidance application may request device identification (ID) from the devices and sensors in a broadcast message (e.g., via Bluetooth). Upon receiving replies from the devices and sensors in second physical environment 200, the media guidance application may refer to a device database, which may feature device lookup information, to determine the name (e.g., security camera) and device type (e.g., video sensor) associated with each device ID. Using this discovery message, the media guidance application may also identify devices that can be used to access the media asset. For example, the media guidance application may identify secondary user equipment 210, which may be the car's speaker system. In response to identifying the sensors and devices present in second physical environment 200, the media guidance application on user 202's mobile device may connect to sensor 206, sensor 208, and secondary user equipment 210.

By connecting to sensor 206, sensor 208 and secondary user equipment 210, the media guidance application on user equipment 204 may be able to determine that the devices and sensors are associated with second physical environment 200, the Uber taxi, and therefore user 202 is in the Uber taxi. However, the media guidance application may further request data from sensor 206 and sensor 208, such as video streams, in order for the media guidance application to determine whether user 202 is present in second physical environment 200 (e.g., via facial or voice recognition analysis on the data collected).

Upon determining that user 202 is in second physical environment 200, the media guidance application on user equipment 204 may determine an attribute of second physical environment 200. The attribute of second physical environment 200 can be a set of unique configurations that the media guidance application may detect. These configurations may include, but are not limited to, the number of individuals in the environment (e.g., group of two people), the interaction between user 202 and the environment (e.g., user is a sitting passenger), the type of environment (e.g., vehicle), a social occasion (e.g., taxi ride), and the devices in the environment (e.g., user's mobile device, car's speaker system).

The media guidance application may search a database, based on the attribute, to identify a first plurality of modes of playback associated with the attribute. The locations database may include a table for each environment with various configurations. Each configuration may be associated with a plurality of modes of playback. The plurality of modes of playback may include devices (e.g., mobile device, car's speaker system, etc.) and services that can be used to play back a media asset (e.g., Netflix, Audible, etc.). Suppose that the locations database has a table dedicated to configurations associated with second physical environment 200, the Uber taxi (e.g., a car). The media guidance application may compare the set of configurations described in the attribute with the configurations in the table. Initially, all modes associated with a car may be enabled for recommendation. For example, the modes may be predetermined by the media guidance application and may include all possible devices and services that can be used based on the devices found in the discovery message sent by user equipment 204. The table of configurations may then serve as a checklist that query user 202's surroundings, role, occasions, services, and devices. For example, one configuration that is linked to visual devices may ask "is user 202 driving?" If the attribute indicates that user 202 is driving, the media guidance application may disable, for recommendation, all devices that require user 202 to rely on visuals (e.g., to avoid distracting user 202 from the road). In this scenario, the media guidance application may determine that because user 202 requested an Uber taxi, he/she is the passenger and will not be driving. There may also be another configuration that asks, "is user 202 allowed access to an identified device (e.g., the car's speaker system)?" In this case, because the only identified device other than user 202's mobile device is secondary user equipment 210 (e.g., the car's speaker system), and secondary user equipment 210 is not associated with user 202, the media guidance application may disable, for recommendation, secondary user equipment 210 (e.g., unless user 202 is given permission to access secondary equipment 210). Another configuration that is linked to a media service/source (e.g., media player on user equipment 204) may ask "does user 202 have access to a local copy of the media asset?". If the attribute indicates that user 202 does not have access to a local copy of the media asset (e.g., on a hard drive), the media guidance application may disable, for recommendation, the media player and the local copy as a source for playback. Another configuration may ask "are bandwidth conditions poor?" For example, the media guidance application may determine the bandwidth conditions of the user (e.g., 5 Mbps) in the second physical environment and determine whether the user meets a minimal bandwidth threshold to access the media asset through the first plurality of modes. For example, the media guidance application may refer to the locations database to determine the minimum bandwidth threshold to access a media asset on Netflix in standard quality (e.g., 3 Mbps). In response to determining that the bandwidth condition of the user (e.g., 5 Mbps) is greater than the minimum bandwidth threshold to access a media asset on Netflix in standard quality, the media guidance application may determine that the user can access a media asset on Netflix and may include Netflix on the user's device as a mode of the first plurality of modes.

In response to the media guidance application comparing all configurations with the attribute, the media guidance application may determine a plurality of modes that are appropriate for accessing a media asset, based on the attribute of second physical environment 200. For example, the media guidance application may identify media-streaming services such as Netflix and HBO Now on user 202's mobile device as a mode that is appropriate for accessing the media asset.

In some embodiments, searching the database, based on the attribute, to identify the first plurality of modes of playback associated with the attribute comprises of the media guidance application determining an environment type of second physical environment 200. The environment type (also referred to as type of environment) is a general description of the environment and may be determined based on the locations database. For example, the locations database may list an environment as "the Statue of Liberty," and the respective environment type may be "landmark." Similarly, the environment may be "the Metropolitan Museum of Art" and the environment type may be "museum." By generalizing the environment into an environment type, the media guidance application may be able to infer additional characteristics of the environment. For example, an environment type of "museum" may be associated with noise restrictions, which may affect the mode of playback the media guidance application identifies. For example, the media guidance application may determine that user 202 is sitting in a vehicle, such as a 2017 Nissan sedan. The environment type may therefore be "car."

The media guidance application may then determine a plurality of candidate roles associated with the environment type. The media guidance application may refer to the locations database to determine that the roles that can be associated with a car include driver, front passenger, back passenger, mechanic, seller, owner, etc. The media guidance application may determine a first role, of the plurality of candidate roles, of the first user, by determining, based on data from the sensor circuitry, that the first user is in a first physical space within second physical environment 200. For example, sensor 206 and sensor 208 may be security cameras placed on the deck of the car, beside the front windshield and back windshield, respectively. The media guidance application may collect the video stream from sensor 206 and sensor 208, and divide the frame of each video into various partitions. For simplicity, suppose that the media guidance application divides each frame from sensor 206 into three partitions, a top half portion focusing on the area of the backseat, a bottom left quadrant focusing on the front passenger seat, and a bottom right quadrant focusing on the driver seat. On the other hand, the video frames outputted by sensor 208 may be separated into three portions as well: upper left quadrant (e.g., driver seat), upper right quadrant (e.g., front passenger seat), and bottom half (e.g., back passenger seat). Using computer vision (e.g., facial recognition, segmentation, edge detection, etc.), the media guidance application may determine that two people are located in second physical environment 200 (where the second person is the driver 212). The media guidance application may identify user 202 through facial recognition by comparing the face of user 202 in the video frames to a reference image of user 202's face in user 202 profile. In this case, the media guidance application may identify user 202 in portions of the video frames associated with the passenger seat. In response, the media guidance application may identify user 202 is in a first physical space of second physical environment 200.

The media guidance application may compare the first physical space to a plurality of physical space templates, wherein each physical space template is associated with a role of the plurality of candidate roles. For example, the media guidance application may refer to a space characteristics database, which features characteristics (e.g., images, audio clips, names, etc.) associated with entries of various physical spaces. Each entry may additionally be classified by a role for users in the area. For example, the space characteristics database may feature images of unique passenger seats associated with a first role "passenger." The media guidance application may compare the image from the video sensor, with the image in the space characteristics database to determine that user 202 is a passenger. In response to determining that the first physical space matches the first physical space template (e.g., image of a passenger seat) corresponding to the first role (e.g., passenger), the media guidance application may identify the first plurality of modes of playback associated with the first role. For example, the media guidance application may refer to the locations database and identify user 202 as a passenger in the configuration of second physical environment 200. As a result, the plurality of modes determined by the media guidance application take the first role into account.

In some embodiments, the media guidance application may detect that a second user, user 212, is present at second physical environment 200 with the first user, user 202. For example, the media guidance application on user equipment 204 may collect data from sensor circuitry (e.g., sensor 206 and/or sensor 208) through a wired or wireless connection. Using image processing, the media guidance application may determine that second physical environment 200 features a second user. The media guidance application may then determine a second role of the plurality of candidate roles, of the second user, user 212, wherein the second role is different from the first role. Using the process described previously, the media guidance application may determine that the second user, user 212, is in the top right quadrant of the video stream of sensor 206 (e.g., focused on the driver seat). Based on the space characteristics database, the media guidance application may determine that the second user, user 212, has a second role, driver.

The media guidance application may identify a second mode of playback that corresponds to the second role, wherein the second mode of playback includes playback using an output that is also used by the first mode and additionally includes an output that is not used by the first mode. For example, the first mode, which is associated with the first role, passenger, may comprise a streaming service (e.g., HBO Now) on user equipment 204. In contrast, the second role, driver, may comprise user 212's own mobile device, along with the secondary user equipment 210 (e.g., car's speaker system). When generating the presentation of the media asset, the media guidance application may select the secondary user equipment as the mode of playback. It should be noted that the media guidance application may also separately consider user 212's accessibility to various modes of playback. For example, user 212 may not have access to a music streaming service, such as HBO Now, while the first user may have access. In response, the media guidance application may still identify HBO Now on the car's speaker system as a mode of playback because at least one of the users has access to the mode. It should also be noted that user 212 may choose to continue accessing a different media asset that user 212 left off at (e.g., independent from the first user).

It should be noted that the role of user 212 may affect the modes that are identified in the plurality of modes by the media guidance application. For example, if two users are in a physical environment, the media guidance application may determine that one of the users is sleeping (e.g., through facial recognition and classification of video streams of a video camera). Accordingly, the media guidance application may determine, from the locations database, that the configurations based on the attribute indicate modes that feature no audio, but have subtitles or closed-captioning, or have the audio channeled through an additional device that is not perceptible to the user who is sleeping (e.g., headphones). If no mode is available with preset subtitles, the media guidance application may generate, for display, closed captioning using voice recognition. Some types of media assets may also be associated with a no-audio configuration in the viewing history database (e.g., determined by the content provider). For example, if the user is accessing a sports game video stream, the user may not need to hear the audio and can understand the sport based on visuals. In some cases, such as a movie, the audio is necessary to accompany the visuals. The media guidance application may identify modes of playback accordingly. Suppose that the user is accessing an audiobook and does not have access to headphones. In this case, audio is a requirement. Because the user cannot use a mode with no audio, the media guidance application may select an e-book service on user equipment 204 as a mode.

The media guidance application may then compare a plurality of versions of the media asset with the identified first plurality of modes to identify a first version of the media asset that corresponds to a first mode. For example, the media guidance application may refer to the Internet to determine the different versions that the media asset is available in. For example, the media guidance application may determine that the episode of "Game of Thrones" accessed by user 202 is available as a video, a book, an audiobook, and a virtual reality video. Suppose that the plurality of modes includes various video streaming services, such as Netflix and HBO Now, that user 202 has access to. Since the plurality of modes only features video streaming services, the media guidance application may select the video version of the episode as the first version. Furthermore, the media guidance application may determine that the episode of "Game of Thrones" can only be found on HBO Now.

The media guidance application may then generate a presentation of the media asset at second physical environment 200 in the identified first version starting from the identified playback position. For example, the media guidance application may retrieve the playback position, 0:05:32, from the viewing history database and generate, for display, the media asset "Game of Thrones" on user 202's user equipment 204.

Suppose that user 202 has access to secondary user equipment 210. In some embodiments, the media guidance application may retrieve a priority level associated with each of the identified modes. For example, the media guidance application may refer to user 202's user profile in storage 508 of user equipment 204 to determine mode preferences. Suppose the media guidance application identifies two modes that user 202 can use to access the media asset. The first mode may be an online video streaming application (e.g., Netflix) on the user equipment 204. As previously mentioned, the car's speaker system may also be able to connect to the Internet directly and retrieve media assets from audio-based services. The media guidance application may determine the second mode to be a split in video and audio such that user 202 may access the video stream of "Game of Thrones" on user equipment 204 and the audio stream on secondary user equipment 210. The media guidance application may refer to the user profile in storage 508 of user equipment 204, which may indicate rankings of various modes based on the user's preference. User 202 may rank video-centric modes (e.g., video on a display) over audio-centric modes (e.g., no visuals) and may rank video and enhanced audio (e.g., surround sound) above all modes. In response to determining that the second mode has a greater priority level than the first mode, the media guidance application may select a version of the media asset that is associated with the second mode.

In some embodiments, the media guidance application may retrieve a social interaction level associated with each of the identified modes. For example, the locations database may further provide information about the modes associated with the environments, detailing a social interaction level. The social interaction level represents the amount of people the mode may engage. For example, the mode consisting of a service being utilized on a mobile device may only engage a single user in an environment such as a car. In contrast, the mode of an audio-centric service on a car's speaker system may engage all users in the car. Accordingly, the media guidance application may determine that the second mode described previously has a higher social interaction level than the first mode. In response, the media guidance application may select a version of the media asset for playback, which is associated with the second mode (e.g., combination of user equipment 204 and secondary user equipment 210).

It should be noted that the media guidance application may rely on a wired (e.g., auxiliary audio cable) or wireless connection (e.g., Bluetooth) to split the video and audio streams of the media asset amongst the devices. Assuming the car's speaker system can independently access the Internet, the media guidance application on both devices may also retrieve the playback position from the viewing history database and begin playback on both devices synchronously. In the case where the versions of the media assets differ, the media guidance application may perform audio processing to synchronize the playback positions of the media asset. For example, if user 202 is accessing a music video, the audio of the music video version of may differ from the audio of the song version. These differences may include additional sounds, or the addition of a preamble to the music video. The media guidance application may process the audio by matching sections with the same frequency and temporal characteristics. Given that user 202 was accessing the music video version in the first physical environment, the media guidance application may identify a second playback position in the song version with audio content that matches the frequency and temporal characteristics of the audio content at the first playback position (e.g., the playback position stored upon user 202's exit from the first physical environment).

In some embodiments, the media guidance application may receive user input classifying second physical environment 200 on user equipment 204 (e.g., through a typed input, a voice command, a gesture, etc.). In the cases where the media guidance application cannot identify second physical environment 200, the media guidance application may request user 202 to classify user 202's environment. For example, the media guidance application may identify a device user 202 is accessing, such as user 202's mobile device, and present the request on user 202's display. The media guidance application may identify a social occasion at second physical environment 200, wherein the social occasion represents an activity that user 202 is participating in. For example, the media guidance application may refer to user 202's calendar in the user profile to determine whether user 202 is participating in a social occasion. The media guidance application may also refer to user 202's social media to determine any social occasions associated with user 202 as mentioned in messages, comments, events pages, and posts. In this case, the media guidance application may determine that user 202 is "travelling" based on the Uber taxi request. In response, the media guidance application may identify a plurality of devices, associated with the social occasion, that is available at second physical environment 200. For example, the media guidance application may emit, from user 202's device, a discovery message to identify devices that are in second physical environment 200 (as discussed previously). Upon determining the available devices, the media guidance application may identify a plurality of devices that are associated with the social occasion, by determining statuses of the relevant configurations in the location database (e.g., "is user 202 driving?", "does user 202 have access to the detected devices in the car?", etc.). For example, because the car does not belong to user 202, the media guidance application may identify a plurality of devices that is appropriately configured for user 202's privacy (e.g., features devices that will not make the media asset perceptible to the driver).

Suppose that of the two users, user 202 and user 212, user 202 is accessing the latest episode of "Game of Thrones" on his set-top box in first physical environment 100. In some embodiments, the media guidance application may detect a user 212 in second physical environment 200. For example, the media guidance application may collect data from sensor circuitry (e.g., sensor 206 and sensor 208) and may further identify the second user (e.g., user 212) through facial recognition or voice recognition. The media guidance application on the secondary user equipment 210 (e.g., associated with user 212) may then access a viewing history of the second user. For example, the media guidance application on secondary user equipment 210 may refer to the viewing history database on the remote server and retrieve the viewing history of user 212. In response to determining that user 212 has not viewed the media asset based on the viewing history, the media guidance application may identify a first device that is not perceptible to user 212. For example, the media guidance application may determine that the latest episode of "Game of Thrones" is not in the viewing history of user 212. In order to prevent spoilers for user 212, the media guidance application may identify a device in second physical environment 200 that is not perceptible to user 212. For example, the media guidance application may identify user equipment 204 (e.g., the first user's mobile device) as a device that user 212 cannot see/hear and only the first user may access. Furthermore, to ensure that user 212 cannot view the media asset, the media guidance application may select the first device to be the mobile device inserted in a virtual reality headset (e.g., Google Daydream) or accompanied with headphones. Accordingly, the version of the media asset will be a virtual reality video. The media guidance application may then generate the presentation of the media asset on user equipment 204.

In some embodiments, the media guidance application may change the speed of playback based on the attributes of second physical environment 200. For example, the media guidance application may determine that user 202 wishes to complete playback of a media asset in certain amount of time. Accordingly, the media guidance application may increase the speed of playback by downsampling the media asset (e.g., reducing the number of frames in a video or temporal components in audio) or decrease the speed of playback by upsampling the media asset (e.g., duplicating frames to increase length of time needed to play back all frames). The speed of playback may also be adjusted using technology such as QuickModem, which is a feature in TiVo's Bolt product. QuickModem allows users to view media at a faster speed with pitch-corrected audio.

In some embodiments, the media guidance application may determine, while the media asset is presented on the first device, that user 212 has reached a current playback position in the media asset. Suppose that user 212 begins accessing an audio version of the media asset "Game of Thrones" on his/her mobile device (e.g., via headphones). It is possible that user 212 may reach the playback position that user 202 is currently on if user 212 is listening on a higher speed than user 202 (e.g., downsampled version). In response to determining that user 212 has reached the current play position in the media asset being presented, the media guidance application may identify a second device that is perceptible to the first user and user 212 (e.g., secondary user equipment 210). The media guidance application may then generate the presentation of the media asset on the second device so that both users can access the media asset together.

The process of synchronizing playback positions at any physical environment provides users with co-viewing experiences as well. For example, suppose that in the first physical environment, the media guidance application detects, using sensor circuitry, a second user that is accessing the first media asset alongside the first user. In response to determining that the first user has exited the first physical environment, the media guidance application may store the playback position at which the first user stopped accessing the first media asset. The media guidance application may further track the second user's playback position in real-time. In response to determining that the first user has entered a second physical environment, the media guidance application may select a suitable mode of playback and a first version of the first media asset, using the methods described previously.

When generating for display, the presentation of the first media asset in the second physical environment, the media guidance application may retrieve the second user's current playback position from the remote server, which stores the viewing history database. As mentioned previously, the media guidance application may also increase or reduce the speed of playback of a media asset based on the user's preferences. Accordingly, the media guidance application may determine the delay between the first user's identified playback position and the second user's current playback position. The media guidance application may provide options to the user such as beginning playback from the first user's identified playback position, beginning playback from the second user's current playback position, or beginning playback from the first user's identified playback position at a higher playback speed/rate until the media asset reaches a synchronized playback position wherein both the first and second user share the same playback position. Likewise, the second user may be provided options to begin playback from the first user's identified playback position, reduce the speed/rate of playback to allow the first user to reach the second user's playback position at the synchronized playback position, or continue viewing without changing playback position or playback speed/rate.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
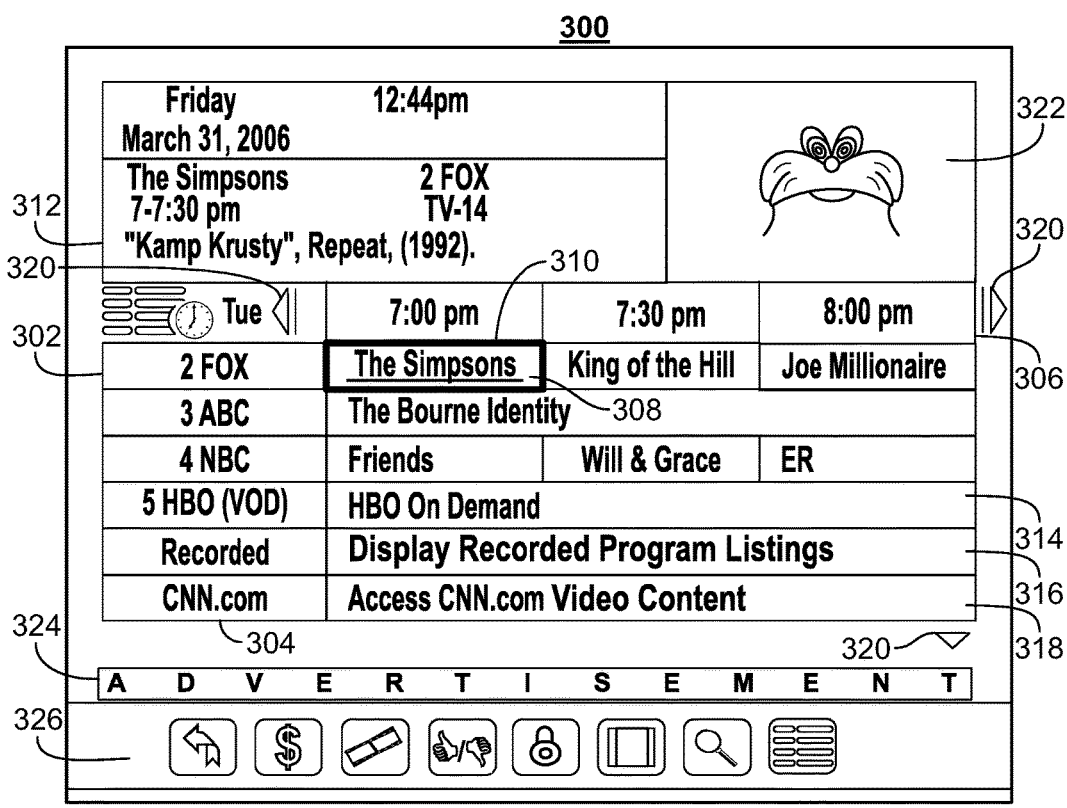
FIGS. 3 and 4 show illustrative examples of display screens generated by a media guidance application in accordance with some embodiments of the disclosure.
Figure 4:
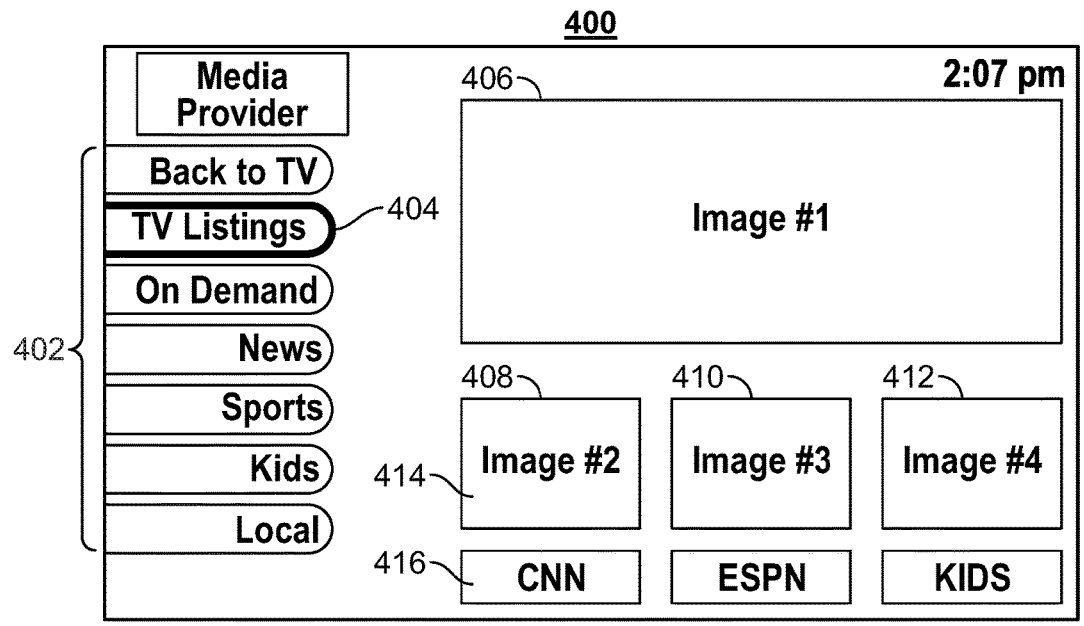

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
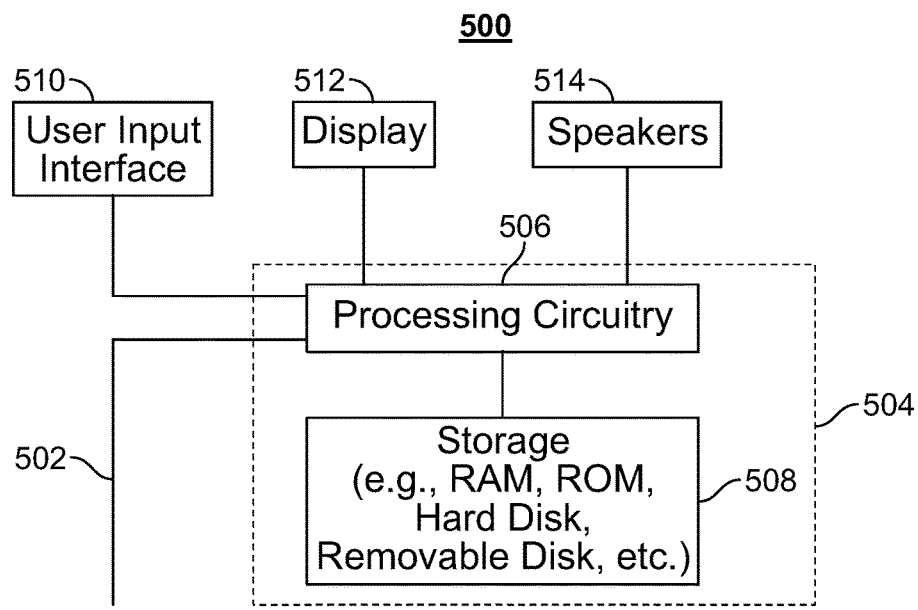
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
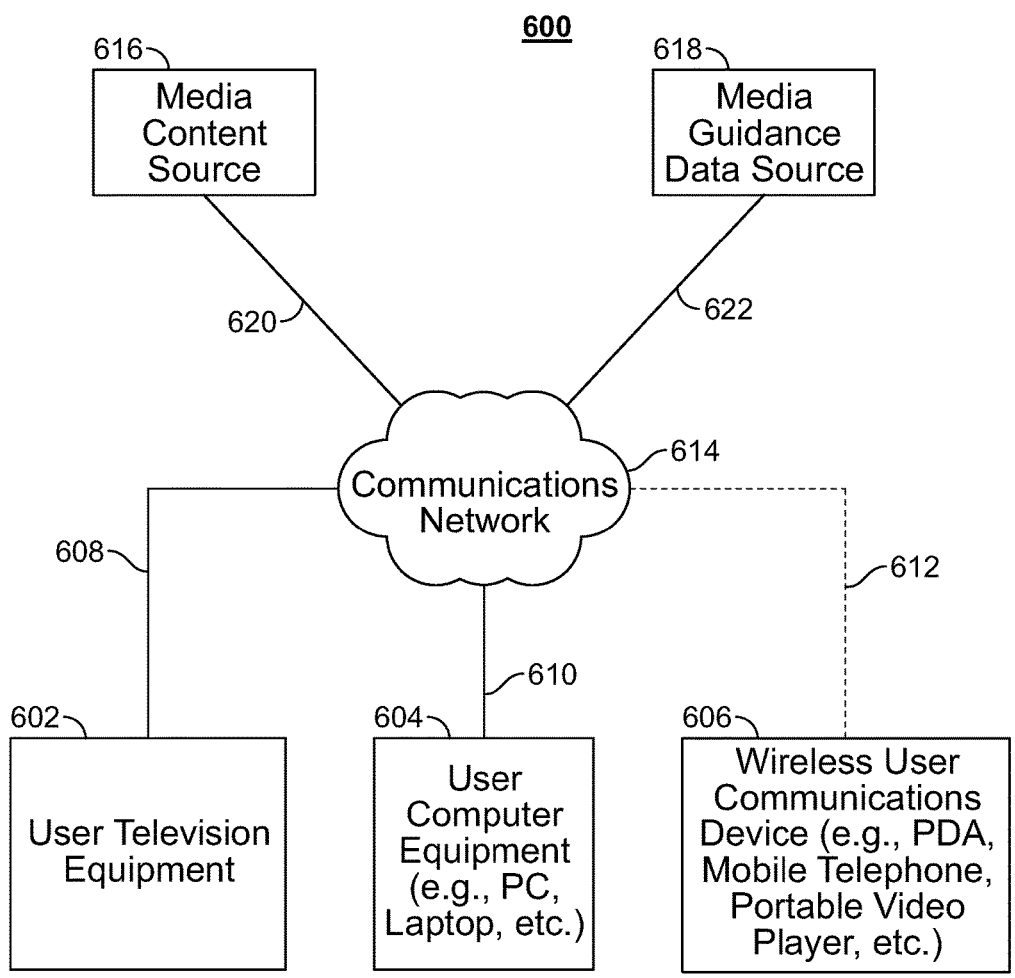
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612.

Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition, or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
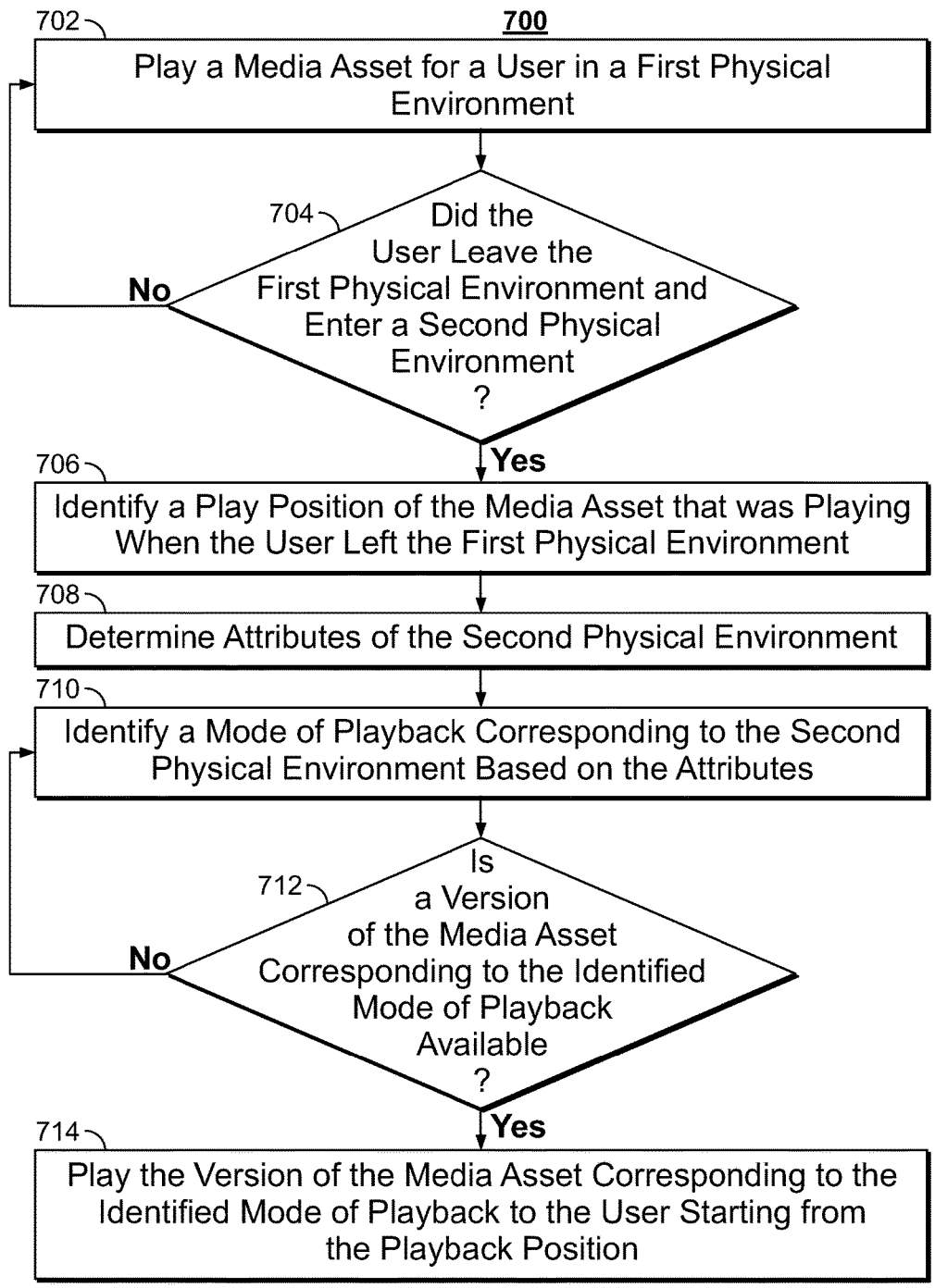
FIG. 7 is a flowchart of an illustrative process for resuming media across devices based on a viewing environment, in accordance with some embodiments of the disclosure.

FIG. 7 is a flowchart of an illustrative process for resuming media across devices based on a viewing environment, in accordance with some embodiments of the disclosure. It should be noted that process 700 or any step thereof could be performed on, or provided by, any of the devices shown in FIGS. 5-6. For example, process 700 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 700 may be incorporated into or combined with one or more steps of any other process or embodiment (e.g., as described in relation to FIGS. 8-14). Many elements of process 700 have been described above with respect to FIGS. 1 and 2, and those descriptions have full force and effect with respect to the below description of process 700, and thus details on previously described elements are omitted for the sake of brevity.

Process 700 begins at 702, where control circuitry 504 plays a media asset (e.g., accessed from media content source 616) for a user in a first physical environment (e.g., which may be displayed on display 412 of user equipment 108). At step 704, control circuitry 504 determines whether the user left the first physical environment and entered a second physical environment. For example, control circuitry 504 may communicate with sensor circuitry (e.g., sensor 104 and network source 106) via communication network 614 to retrieve data that can be analyzed to determine the user's location. If control circuitry 504 determines that the user did not leave the first physical environment, the process returns to step 702 and control circuitry 504 on user equipment 108 continues to play the media asset for the user in the first physical environment. If control circuitry 504 determines that the user did leave the first physical environment and entered a second physical environment, the process continues to step 706 where control circuitry 504 identifies a play position of the media asset that was playing when the user left the first physical environment. Control circuitry 504 may store the play position in storage 508 of user equipment 204, or on a remote server (e.g., a viewing history database) connected to communication network 614.

At step 708, control circuitry 504 on user equipment 204 determines attributes of the second physical environment. Control circuitry 504 may determine the attributes of the second physical environment by analyzing data received from sensor circuitry (e.g., sensor 206, sensor 208) and other user equipment (e.g., secondary user equipment 210) that may be in the second physical environment. For example, if sensor 206 is a security camera, control circuitry 504 may analyze the video stream from the security camera to detect the type of environment, the objects in the environment, the number of users, etc. Control circuitry 504 may also retrieve a user profile in storage 508 of user equipment 204, or a remote server connected to user equipment 204 through communication network 614. Based on the user profile, control circuitry 504 may determine attributes such as the media services the user has access to, an event the user is participating in, the calendar of the user, etc.

At step 710, control circuitry 504 identifies a mode of playback corresponding to the second physical environment, based on the attributes. For example, control circuitry 504 may identify a device, or a combination of devices (e.g., user equipment 204 and/or secondary user equipment 210) and a service/application (e.g., video streaming service such as Netflix, local smartphone media player) that are suitable for use based on the attributes of the second physical environment. At step 712, control circuitry 504 determines whether a version of the media asset corresponding to the identified mode of playback is available. For example, if control circuitry 504 identifies a video streaming service, such as Netflix, utilized on user equipment 204 as a mode of playback, control circuitry 504 may search for the media asset in the Netflix library (e.g., via media guidance data source 518). If control circuitry 504 determines that a version of the media asset corresponding to the identified mode of playback is not available, the process returns to step 710 and control circuitry identifies an alternate mode of playback. If control circuitry 504 determines that a version of the media asset corresponding to the identified mode of playback is available, the process ends at step 714 where control circuitry 504 plays the version of the media asset corresponding to the identified mode of playback (e.g., on display 512 of user equipment 204) to the user starting from the playback position (e.g., retrieved from viewing history database in storage 508 or remote server in communication network 614).

Figure 8:
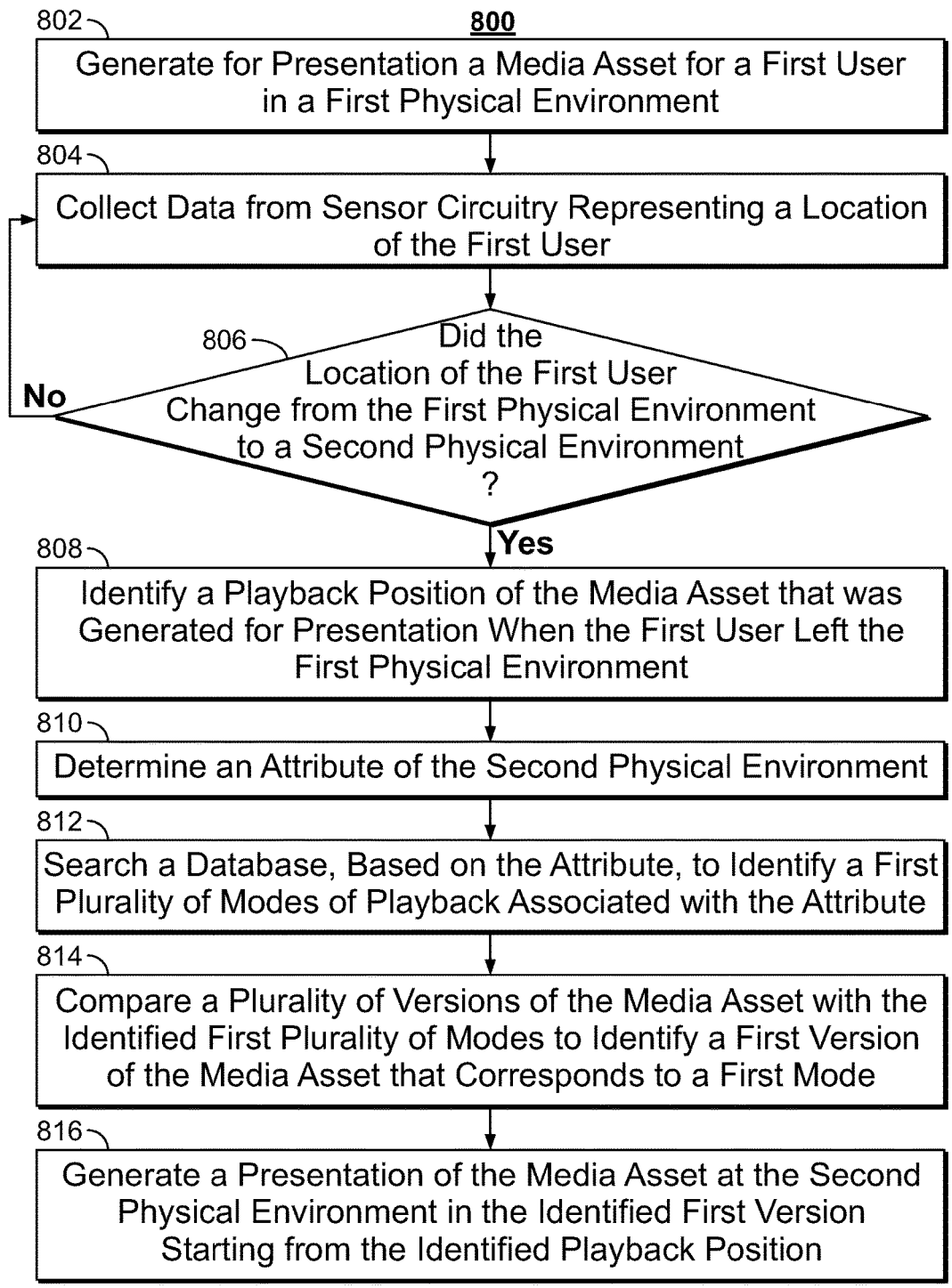
FIG. 8 is a flowchart of a detailed illustrative process for resuming media in different modes of playback based on attributes of a physical environment where the media is being resumed, in accordance with some embodiments of the disclosure.

FIG. 8 is a flowchart of a detailed illustrative process for resuming media in different modes of playback based on attributes of a physical environment where the media is being resumed, in accordance with some embodiments of the disclosure. It should be noted that process 800 or any step thereof could be performed on, or provided by, any of the devices shown in FIGS. 5-6. For example, process 800 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 800 may be incorporated into or combined with one or more steps of any other process or embodiment (e.g., as described in relation to FIGS. 7 and 9-14). Many elements of process 800 have been described above with respect to FIGS. 1 and 2, and those descriptions have full force and effect with respect to the below description of process 800, and thus details on previously described elements are omitted for the sake of brevity.

Process 800 begins at 802, where control circuitry 504 generates for presentation a media asset (e.g., accessed from media content source 616) for a first user in a first physical environment (e.g., which may be displayed on display 412 of user equipment 108). At step 804, control circuitry 504 collects data from sensor circuitry representing a location of the first user. For example, control circuitry 504 may communicate with sensor circuitry (e.g., sensor 104 and network source 106) via communication network 614 to retrieve data that can be analyzed to determine the user's location. At step 806, control circuitry 504 determines whether the user left the first physical environment and entered a second physical environment. If control circuitry 504 determines that the user did not leave the first physical environment, the process returns to step 804 and control circuitry 504 on user equipment 108 continues collecting data from sensor circuitry to determine the location of the user. If control circuitry 504 determines that the user did leave the first physical environment and entered a second physical environment, the process continues to step 808 where control circuitry 504 identifies a playback position of the media asset that was generated for presentation when the first user left the first physical environment. Control circuitry 504 may store the play position in storage 508 of user equipment 204, or on a remote server (e.g., a viewing history database) connected to communication network 614.

At step 810, control circuitry 504 on user equipment 204 determines an attribute of the second physical environment. Control circuitry 504 may determine the attribute of the second physical environment by analyzing data received from sensor circuitry (e.g., sensor 206, sensor 208) and other user equipment (e.g., secondary user equipment 210) that may be in the second physical environment. For example, if sensor 206 is a security camera, control circuitry 504 may analyze the video stream from the security camera to detect the type of environment, the objects in the environment, the number of users, etc. Control circuitry 504 may also retrieve a user profile in storage 508 of user equipment 204, or a remote server connected to user equipment 204 through communication network 614. Based on the user profile, control circuitry 504 may determine an attribute, including the media services the user has access to, an event the user is participating in, the calendar of the user, etc.

At step 812, control circuitry 504 searches a database, based on the attribute, to identify a first plurality of modes of playback associated with the attribute. For example, control circuitry 504 may identify a device, or a combination of devices (e.g., user equipment 204 and/or secondary user equipment 210) and a service/application (e.g., video streaming service such as Netflix, local smartphone media player) that are suitable for use based on the attribute of the second physical environment. Control circuitry 504 may use the locations database described previously to determine modes of playback based on the configuration (e.g., indicated by the attribute) of the second physical environment. At step 814, control circuitry 504 compares a plurality of versions of the media asset with the identified first plurality of modes to identify a first version of the media asset that corresponds to a first mode. For example, if control circuitry 504 identifies a video streaming service, such as Netflix, utilized on user equipment 204 as a mode of playback, control circuitry 504 may search for the media asset in the Netflix library (e.g., via media guidance data source 518). Control circuitry 504 may compare various modes and versions, until a first version and a corresponding first mode are determined (e.g., the movie is found in the Netflix library, making the movie the first version, and Netflix on the user's device the first mode). The process ends at step 816 where control circuitry 504 generates a presentation of the media asset (e.g., on display 512 of user equipment 204, or on secondary user equipment 210) at the second physical environment in the identified first version starting from the identified playback position (e.g., retrieved from viewing history database in storage 508 or remote server in communication network 614).

Figure 9:
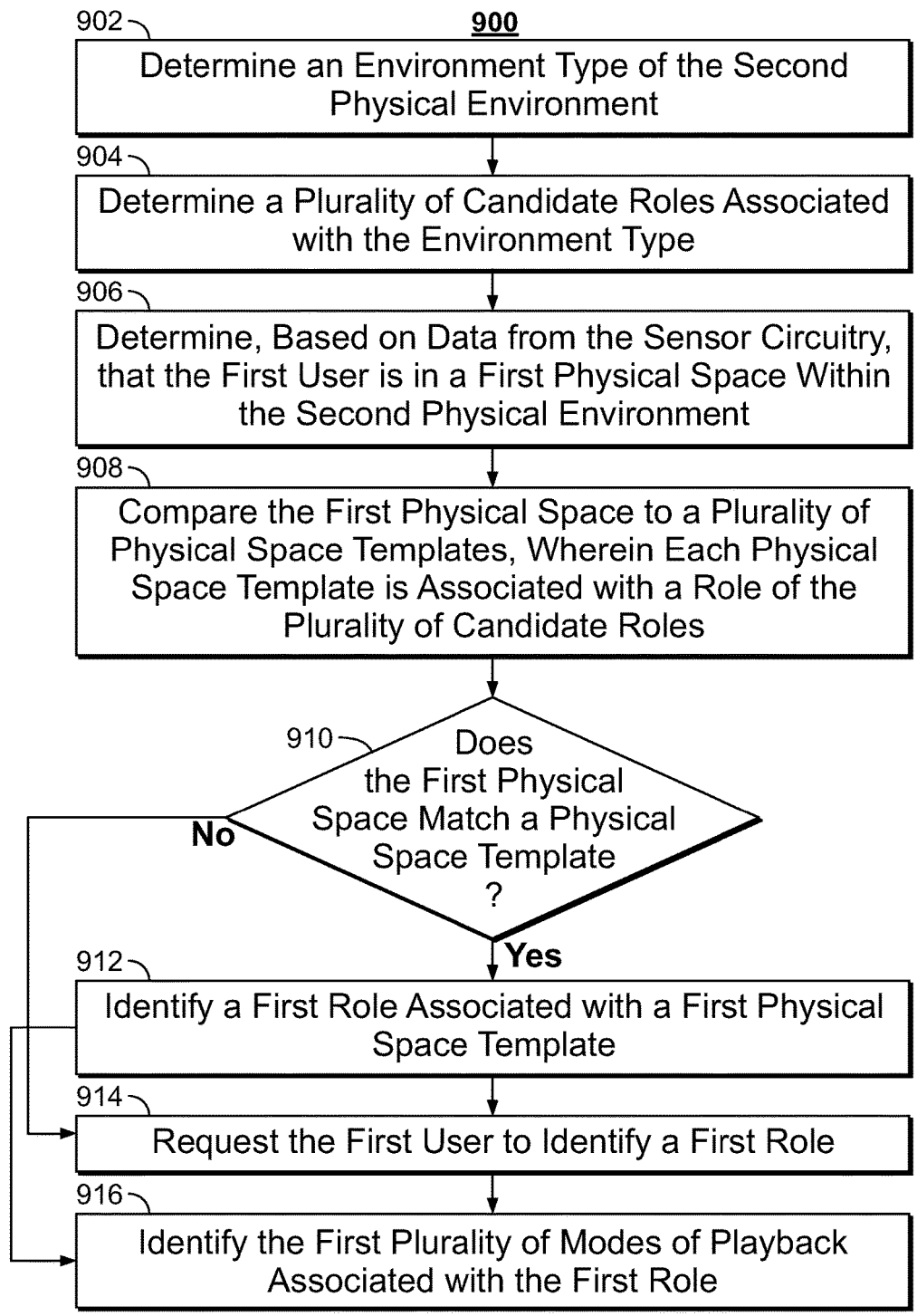
FIG. 9 is a flowchart of a detailed illustrative process for generating the presentation of the media asset based on the first role of the first user, in accordance with some embodiments of the disclosure.

FIG. 9 is a flowchart of a detailed illustrative process for generating the presentation of the media asset based on the first role of the first user, in accordance with some embodiments of the disclosure. It should be noted that process 900 or any step thereof could be performed on, or provided by, any of the devices shown in FIGS. 5-6. For example, process 900 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 900 may be incorporated into or combined with one or more steps of any other process or embodiment (e.g., as described in relation to FIGS. 7-8 and 10-14). Many elements of process 900 have been described above with respect to FIGS. 1 and 2, and those descriptions have full force and effect with respect to the below description of process 900, and thus details on previously described elements are omitted for the sake of brevity.

Process 900 begins at step 902 where control circuitry 504 determines an environment type of the second physical environment. For example, if the second physical environment is a car, 2017 Nissan Rogue, the environment type may be a broader classification (e.g., "car" or "vehicle"). At step 904, control circuitry 504 determines a plurality of candidate roles associated with the environment type. For example, the candidate roles for the environment type "car" may be driver, passenger, mechanic, seller, etc. At step 906, control circuitry 504 determines, based on data from the sensor circuitry, that the first user is in a first physical space within the second physical environment. For example, control circuitry 504 on user equipment 204 may communicate with sensor 206 (e.g., a security camera) to determine a physical space inside the second physical environment that the user is in (e.g., driver seat, passenger seat, etc.). At step 908, control circuitry 504 compares the first physical space to a plurality of physical space templates, wherein each physical space template is associated with a role of the plurality of candidate roles. For example, control circuitry 504 may compare an image of the user in the first physical space and classify the first physical space based on a database of images, wherein each image in the database is associated with a role (e.g., driver seat may be associated with driver).

At step 910, control circuitry 504 determines whether the first physical space matches a physical space template. For example, control circuitry 504 may compare the image of the first physical space with entries in a database of physical space templates. If control circuitry 504 determines that the first physical spaces does not match any physical space templates, the process continues to step 914 where control circuitry 504 requests the first user to identify a first role. For example, control circuitry 504 may generate for display, on display 412 of user equipment 204, a prompt that allows the user to enter his/her role via I/O Path 502. If control circuitry 504 determines that the first physical spaces matches at least one of the physical space templates, the process continues to step 912 where control circuitry 504 identifies a first role associated with a first physical space template. At step 916, control circuitry 504 identifies the first plurality of modes of playback associated with the first role.

Figure 10:
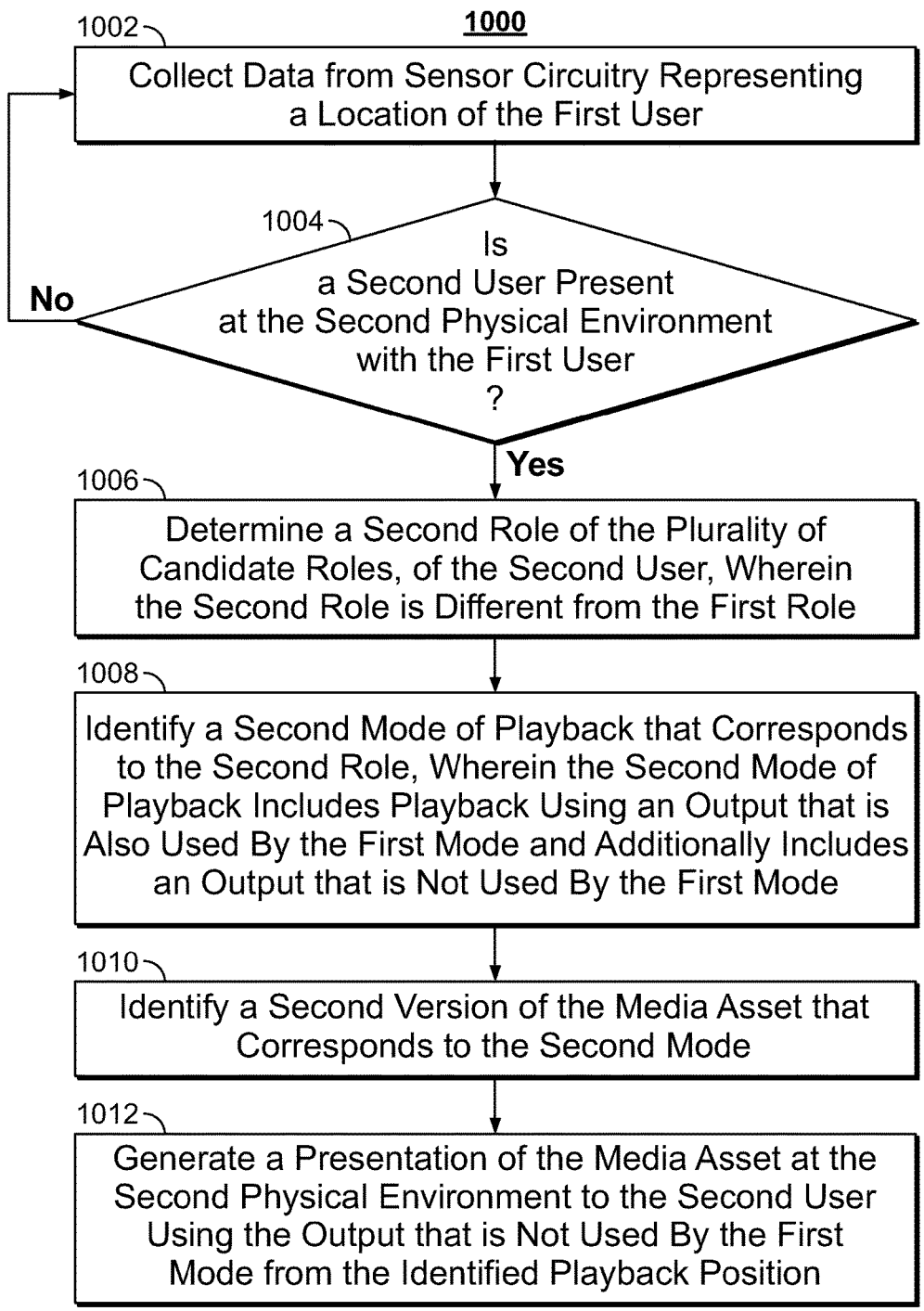
FIG. 10 is a flowchart of a detailed illustrative process for generating the presentation of the media asset based on the second role of the second user, in accordance with some embodiments of the disclosure.

FIG. 10 is a flowchart of a detailed illustrative process for generating the presentation of the media asset based on the second role of the second user, in accordance with some embodiments of the disclosure. It should be noted that process 1000 or any step thereof could be performed on, or provided by, any of the devices shown in FIGS. 5-6. For example, process 1000 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1000 may be incorporated into or combined with one or more steps of any other process or embodiment (e.g., as described in relation to FIGS. 7-9 and 11-14). Many elements of process 1000 have been described above with respect to FIGS. 1 and 2, and those descriptions have full force and effect with respect to the below description of process 1000, and thus details on previously described elements are omitted for the sake of brevity.

Process 1000 begins at step 1002 where control circuitry 504 collects data from sensor circuitry (e.g., sensor 206, sensor 208) representing a location of the first user. At step 1004, control circuitry 504 determines whether a second user is present at the second physical environment with the first user. For example, using data from sensor circuitry (e.g., video stream from a security camera) control circuitry 504 on user equipment 204 may determine whether a second user is present in the video frames (e.g., via computer vision, image processing, etc.). If control circuitry 504 determines that a second user is not present at the second physical environment, the process returns to step 1002, as control circuitry 504 continues to collect and analyze data from sensor circuitry. If control circuitry determines that a second user is present at the second physical environment, the process advances to step 1006 where control circuitry 504 determines a second role of the plurality of candidate roles, of the second user, wherein the second role is different from the first role. For example, control circuitry 504 may identify a second physical space in the second physical environment where the second user is and determine a role based on the physical space templates. This role may be different from the role of the first user.

At step 1010, control circuitry 504 identifies a second mode of playback that corresponds to the second role, wherein the second mode of playback includes playback using an output that is also used by the first mode and additionally includes an output that is not used by the first mode. For example, the first mode of playback may only use user equipment 204 as an output and the second mode of playback may include both user equipment 204 and secondary user equipment 210 as outputs. At step 1012, control circuitry 504 identifies a second version of the media asset that corresponds to the second mode. For example, control circuitry 504 may identify a version of the media asset (e.g., movie) that may utilize display 412 of user equipment 204 and/or the audio output of secondary user equipment 210. At step 1014, control circuitry 504 generates a presentation of the media asset at the second physical environment to the second user using the output that is not used by the first mode (e.g., audio output from secondary user equipment 210) from the identified playback position.

Figure 11:
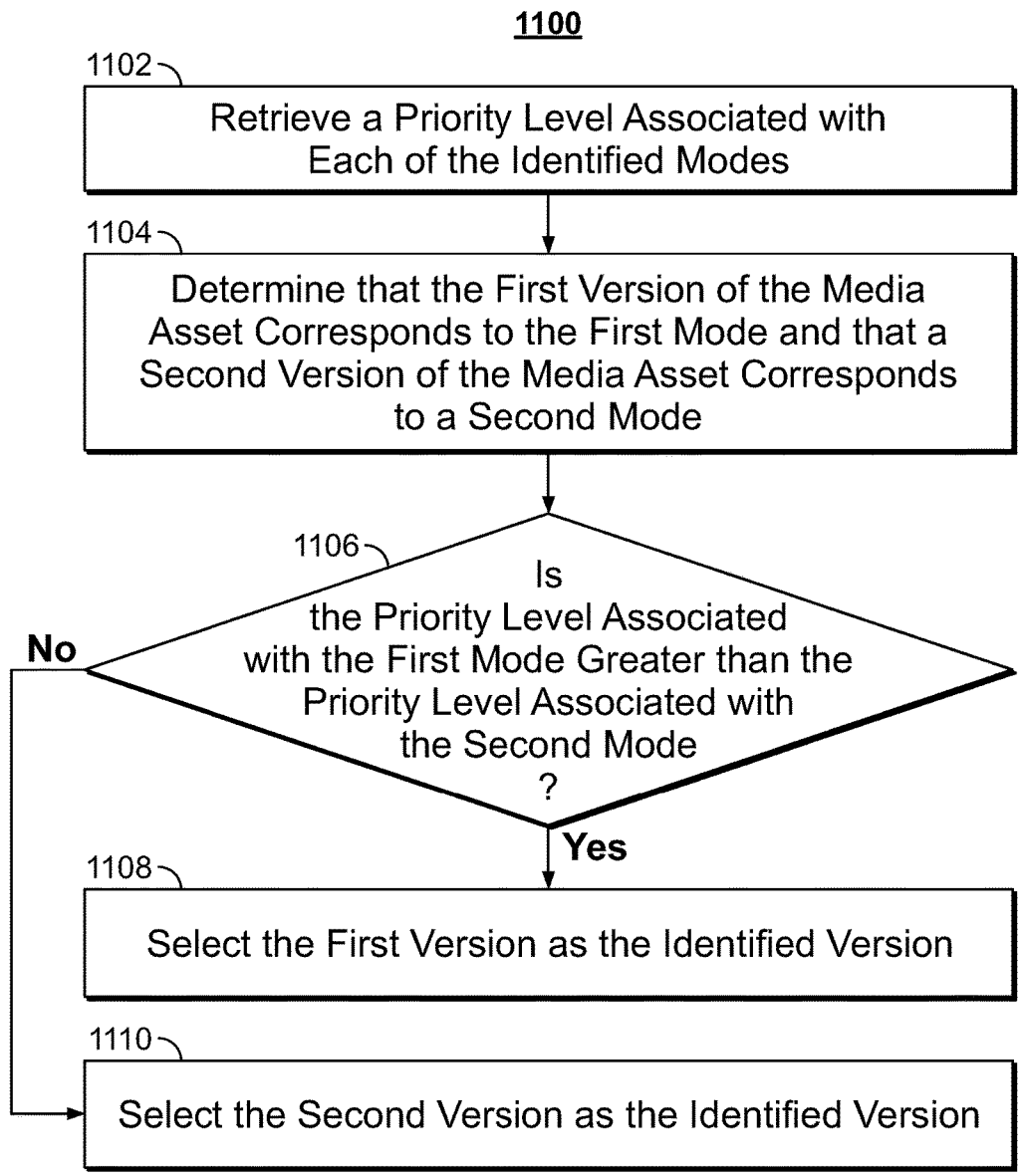
FIG. 11 is a flowchart of a detailed illustrative process for selecting the first version as the identified version based on a priority level of each mode, in accordance with some embodiments of the disclosure.

FIG. 11 is a flowchart of a detailed illustrative process for selecting the first version as the identified version based on a priority level of each mode, in accordance with some embodiments of the disclosure. It should be noted that process 1100 or any step thereof could be performed on, or provided by, any of the devices shown in FIGS. 5-6. For example, process 1100 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1100 may be incorporated into or combined with one or more steps of any other process or embodiment (e.g., as described in relation to FIGS. 7-10 and 12-14). Many elements of process 1100 have been described above with respect to FIGS. 1 and 2, and those descriptions have full force and effect with respect to the below description of process 1100, and thus details on previously described elements are omitted for the sake of brevity.

Process 1100 begins at step 1102 where control circuitry 504 retrieves a priority level associated with each of the identified modes (e.g., from user profile in storage 508). At step 1104, control circuitry 504 determines that the first version of the media asset corresponds to the first mode and that a second version of the media asset corresponds to a second mode. At step 1106, control circuitry 504 determines whether the priority level associated with the first mode is greater than the priority level associated with the second mode. For example, control circuitry 504 may retrieve rankings of preferred modes from the user profile. Control circuitry 504 may determine that the ranking of the first mode is higher than the ranking of the second mode. In response, the process continues to step 1108 where control circuitry 504 selects the first version as the identified version (e.g., the version that is associated with the first mode). If control circuitry 504 determines that the priority level of the second mode is greater than the priority level of the first mode, then at step 1110, control circuitry 504 selects the second version as the identified version.

Figure 12:
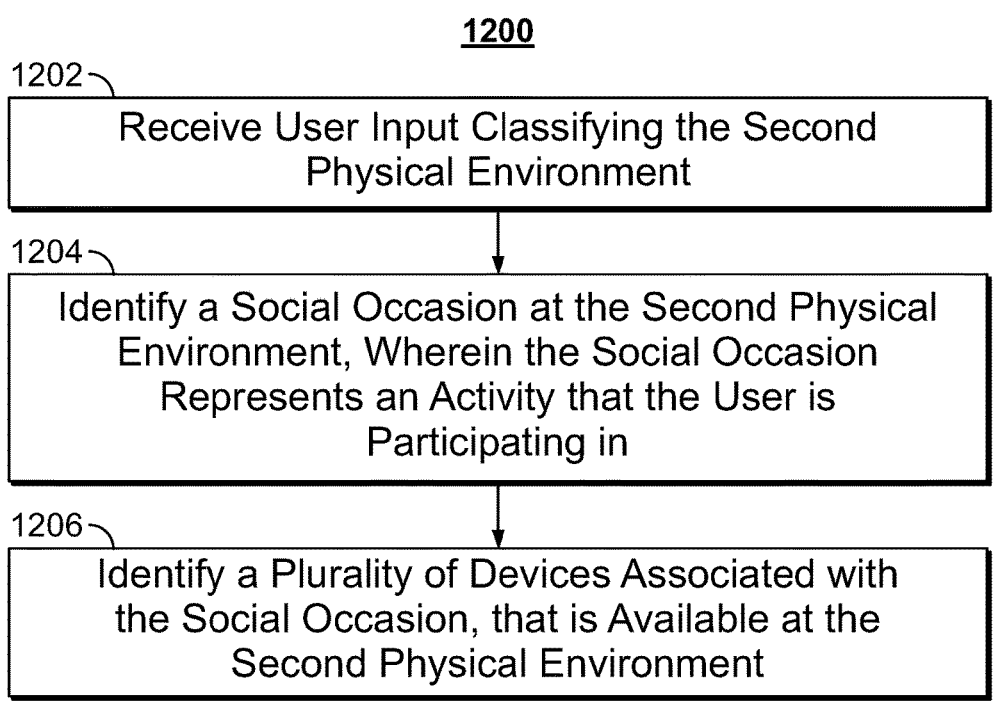
FIG. 12 is a flowchart of a detailed illustrative process for identifying a plurality of devices available at the second physical environment based on a social occasion, in accordance with some embodiments of the disclosure.

FIG. 12 is a flowchart of a detailed illustrative process for identifying a plurality of devices available at the second physical environment based on a social occasion, in accordance with some embodiments of the disclosure. It should be noted that process 1200 or any step thereof could be performed on, or provided by, any of the devices shown in FIGS. 5-6. For example, process 1200 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1200 may be incorporated into or combined with one or more steps of any other process or embodiment (e.g., as described in relation to FIGS. 7-11 and 13-14). Many elements of process 1200 have been described above with respect to FIGS. 1 and 2, and those descriptions have full force and effect with respect to the below description of process 1200, and thus details on previously described elements are omitted for the sake of brevity.

Process 1200 begins at step 1202 where control circuitry 504 receives user input classifying the second physical environment (e.g., via I/O Path 502). For example, control circuitry 504 may prompt the user on display 412 of user equipment 204 to identify the second physical environment. At step 1204, control circuitry 504 identifies a social occasion (e.g., based on user profile in storage 508 or social media) at the second physical environment, wherein the social occasion represents an activity that the user is participating in. At step 1206, control circuitry 504 identifies a plurality of devices, associated with the social occasion, that are available at the second physical environment. For example, the social occasion may be a birthday party which several guests are attending. Accordingly, control circuitry 504 may include the social occasion in the attribute of the second physical environment and refer to the locations database to identify device types (may also be referred to as an output of the mode) that are associated with the social occasion (e.g., loudspeaker, projector, etc.).

Figure 13:
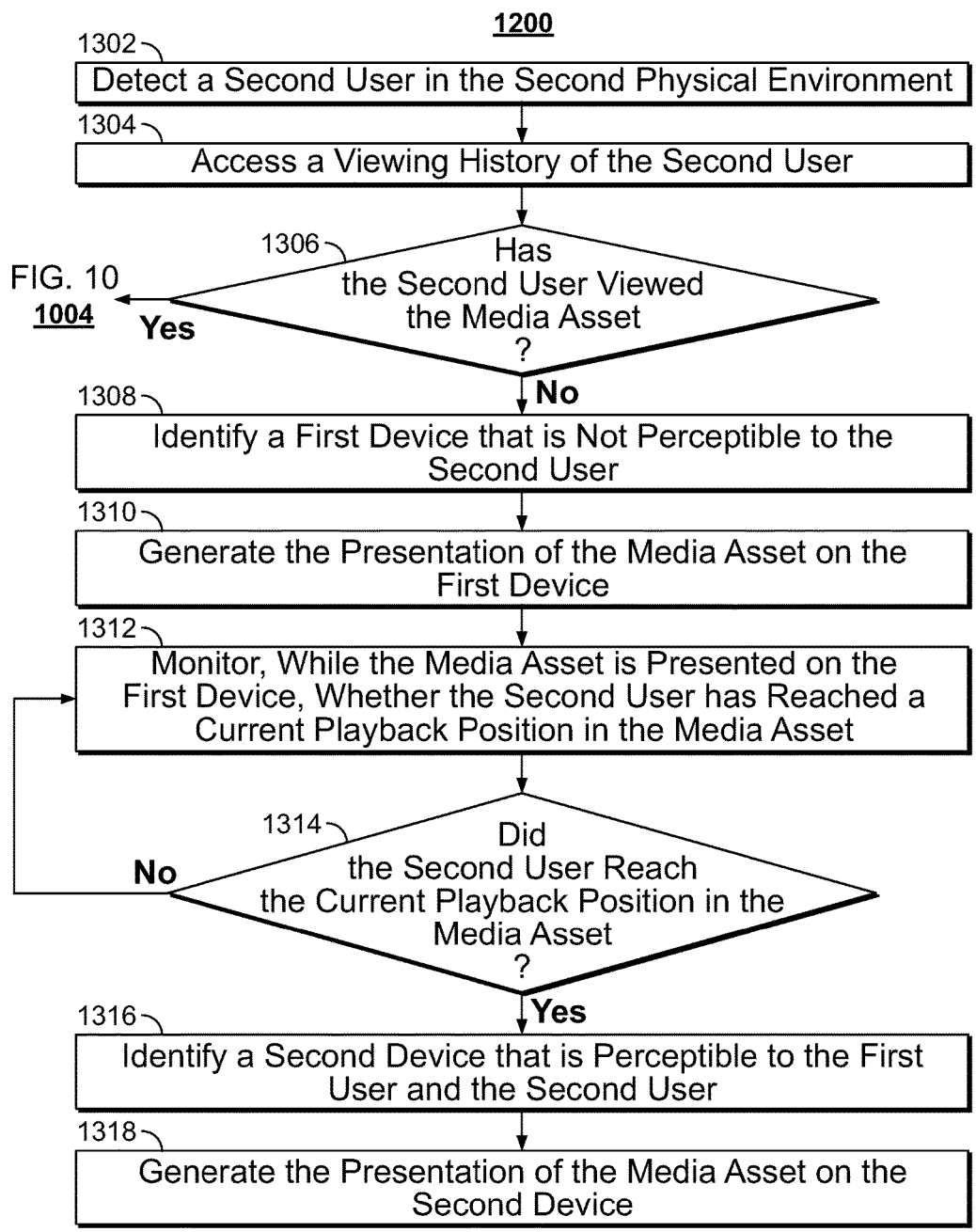
FIG. 13 is a flowchart of a detailed illustrative process for generating the presentation of the media asset on a device based on the viewing history of a second user, in accordance with some embodiments of the disclosure.

FIG. 13 is a flowchart of a detailed illustrative process for generating the presentation of the media asset on a device based on the viewing history of a second user, in accordance with some embodiments of the disclosure. It should be noted that process 1300 or any step thereof could be performed on, or provided by, any of the devices shown in FIGS. 5-6. For example, process 1300 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1300 may be incorporated into or combined with one or more steps of any other process or embodiment (e.g., as described in relation to FIGS. 7-12 and 14). Many elements of process 1300 have been described above with respect to FIGS. 1 and 2, and those descriptions have full force and effect with respect to the below description of process 1300, and thus details on previously described elements are omitted for the sake of brevity.

Process 1300 begins at step 1302 where control circuitry 504 detects a second user in the second physical environment. Step 1302 may embody steps 1002 and 1004 of FIG. 10. At step 1304, control circuitry 504 accesses a viewing history of the second user (e.g., from viewing history database on remote server or from a device associated with the second user connected via communications network 614). At step 1306, control circuitry 504 determines whether the second user has viewed the media asset (e.g., based on viewing history of the second user). In response to determining that the second user has seen the media asset, the process returns to step 1004 and continues process 1000. In response to determining that the second user has not seen the media asset, control circuitry 504 identifies a first device that is not perceptible to the second user. For example, if the second user is driver 212, control circuitry 504 may identify user equipment 204, which is not perceptible to the driver because user 202, with user equipment 204, is in a different physical space and user equipment 204 is a handheld personal device. At step 1310, control circuitry 504 generates the presentation of the media asset on the first device (e.g., user equipment 204).

At step 1312, control circuitry 504 monitors, while the media asset is presented on the first device, whether the second user has reached a current playback position in the media asset. For example, the first user may stop accessing the media asset. During this time, the second user may reach the current playback position in the media asset. When the first user begins watching the media asset on the first device, control circuitry 504 may determine that the second user has reached the current playback position in the media asset. At step 1314, control circuitry 504 determines whether the second user reached the current playback position in the media asset. If control circuitry 504 determines that the second user did not reach the current playback position, the process returns to step 1312 and control circuitry 504 continues to monitor the second user's playback position. If control circuitry 504 determines that the second user has reached the current playback position, control circuitry 504 identifies a second device (e.g., secondary user equipment 210) that is perceptible to the first user and the second user at step 1316. At step 1318, control circuitry 504 generates the presentation of the media asset on the second device.

Figure 14:
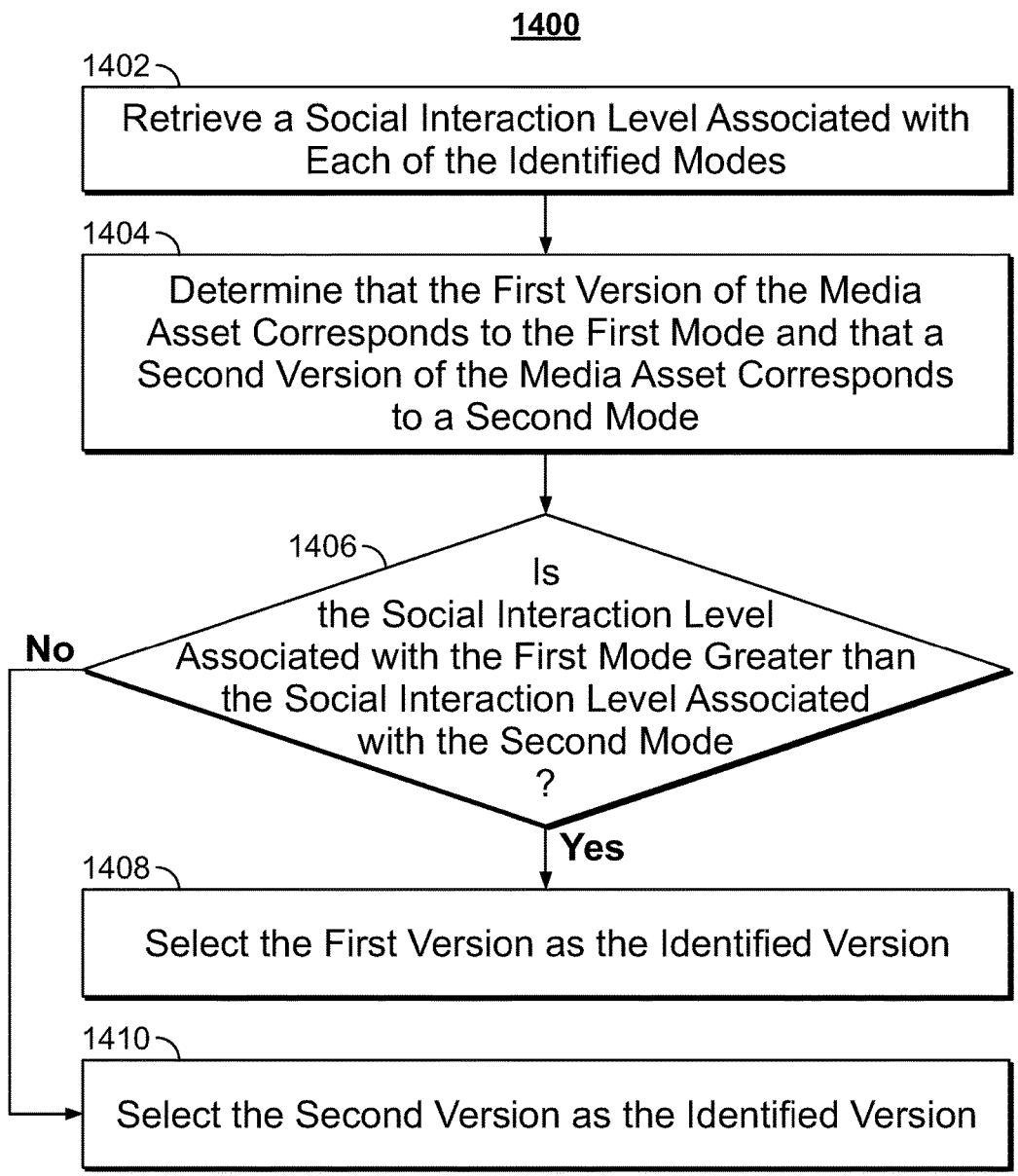
FIG. 14 is a flowchart of a detailed illustrative process for selecting a version of the media asset based on the social interaction level associated with the respective mode, in accordance with some embodiments of the disclosure.

FIG. 14 is a flowchart of a detailed illustrative process for selecting a version of the media asset based on the social interaction level associated with respective mode, in accordance with some embodiments of the disclosure. It should be noted that process 1400 or any step thereof could be performed on, or provided by, any of the devices shown in FIGS. 5-6. For example, process 1400 may be executed by control circuitry 504 (FIG. 5) as instructed by a media guidance application implemented on user equipment 108 (which may have the functionality of any or all of user equipment 602, 604, and/or 606 (FIG. 6)). In addition, one or more steps of process 1400 may be incorporated into or combined with one or more steps of any other process or embodiment (e.g., as described in relation to FIGS. 7-13). Many elements of process 1400 have been described above with respect to FIGS. 1 and 2, and those descriptions have full force and effect with respect to the below description of process 1400, and thus details on previously described elements are omitted for the sake of brevity.

Process 1400 begins at step 1402 where control circuitry 504 retrieves a social interaction level associated with each of the identified modes (e.g., from user profile in storage 508, social media, or the Internet). At step 1404, control circuitry 504 determines that the first version of the media asset corresponds to the first mode and that a second version of the media asset corresponds to a second mode. At step 1406, control circuitry 504 determines whether the social interaction level associated with the first mode is greater than the social interaction level associated with the second mode. For example, control circuitry 504 may retrieve rankings of social interaction of modes from the user profile. Control circuitry 504 may determine that the ranking of the first mode is higher than the ranking of the second mode. In response, the process continues to step 1408 where control circuitry 504 selects the first version as the identified version (e.g., the version that is associated with the first mode). If control circuitry 504 determines that the social interaction level of the second mode is greater than the social interaction level of the first mode, then at step 1410, control circuitry 504 selects the second version as the identified version.

It should be noted that processes 700-1400 or any step thereof could be performed on, or provided by, any of the devices shows in FIGS. 1, 2 and 5-6. For example, any of processes 700-1400 may be executed by control circuitry 504 (FIG. 5) as instructed by control circuitry implemented on user equipment 602, 604, 606 (FIG. 5), and/or a user equipment device for selecting a recommendation. In addition, one or more steps of processes 700-1400 may be incorporated into or combined with one or more steps of any other process or embodiment.

It is contemplated that the steps or descriptions of each of FIGS. 7-14 may be used with any other embodiment of this disclosure. In addition, the steps and descriptions described in relation to FIGS. 7-14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1, 2 and 4-5 could be used to perform one or more of the steps in FIGS. 7-14.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for resuming media in different modes of playback based on attributes of a physical environment where the media is being resumed, the method comprising:
   generating for presentation a media asset for a first user in a first physical environment;
   collecting data from sensor circuitry representing a location of the first user;
   processing the collected data to determine the location of the first user has changed from the first physical environment to a second physical environment indicating that the first user has left the first physical environment and has entered the second physical environment; and
   in response to determining that the location of the first user has changed:
      identifying a playback position of the media asset that was generated for presentation when the first user left the first physical environment;
      determining an attribute of the second physical environment;
      determining an environment type of the second physical environment;
      determining a plurality of candidate roles associated with the environment type;
      determining a first role, of the plurality of candidate roles, of the first user, by:
         determining, based on data from the sensor circuitry, that the first user is in a first physical space within the second physical environment;
         comparing the first physical space to a plurality of physical space templates, wherein each physical space template is associated with a role of the plurality of candidate roles;
determining, based on the comparing, whether the first physical space matches a first physical space template corresponding to the first role; and
in response to determining that the first physical space matches the first physical space template corresponding to the first role, identifying a first plurality of modes of playback associated with the first role;
comparing a plurality of versions of the media asset with the identified first plurality of modes to identify a first version of the media asset that corresponds to a first mode; and
generating a presentation of the media asset at the second physical environment in the identified first version starting from the identified playback position.

2. The method of claim 1, further comprising:
detecting that a second user is present at the second physical environment with the first user;
determining a second role of the plurality of candidate roles, of the second user, wherein the second role is different from the first role;
identifying a second mode of playback that corresponds to the second role, wherein the second mode of playback includes playback using an output that is also used by the first mode and additionally includes an output that is not used by the first mode;
identifying a second version of the media asset that corresponds to the second mode; and
generating a presentation of the media asset at the second physical environment to the second user using the output that is not used by the first mode from the identified playback position.

3. The method of claim 1, further comprising:
retrieving a priority level associated with each of the identified modes;
determining that the first version of the media asset corresponds to the first mode and that a second version of the media asset corresponds to a second mode; and
selecting the first version as the identified version in response to determining that a priority level associated with the first mode is greater than a priority level associated with the second mode.

4. The method of claim 1, wherein the first mode presents content using a single device configured to output audio only, wherein a second mode of the modes presents content using multiple types of devices simultaneously, and wherein generating for presentation the media asset in the second physical environment comprises generating a display of the media asset on a display device and outputting audio of the media asset via a separate audio output device.

5. The method of claim 1, wherein determining the attribute comprises:
receiving user input classifying the second physical environment;
identifying a social occasion at the second physical environment, wherein the social occasion represents an activity that the user is participating in; and
identifying a plurality of devices associated with the social occasion that are available at the second physical environment.

6. The method of claim 1, wherein determining the attribute comprises:
detecting a second user in the second physical environment;
accessing a viewing history of the second user; and
in response to determining that the second user has not viewed the media asset based on the viewing history:
identifying a first device that is not perceptible to the second user; and
generating the presentation of the media asset on the first device.

7. The method of claim 6, further comprising:
determining, while the media asset is presented on the first device, that the second user has reached a current playback position in the media asset; and
in response to determining that the second user has reached the current play position in the media asset being presented:
identifying a second device that is perceptible to the first user and the second user; and
generating the presentation of the media asset on the second device.

8. The method of claim 7, wherein generating the presentation of the media asset on the second device comprises changing the identified version from the first version of the media asset that corresponds to the first mode associated with the first device, to a second version of the media asset that corresponds to a second mode associated with the second device.

9. The method of claim 1, further comprising:
retrieving a social interaction level associated with each of the identified modes;
determining that the first version of the media asset corresponds to the first mode and that a second version of the media asset corresponds to a second mode; and
selecting the first version as the identified version in response to determining that the social interaction level associated with the first mode is greater than the social interaction level associated with the second mode.

10. A system for resuming media in different modes of playback based on attributes of a physical environment where the media is being resumed, the system comprising:
sensor circuitry; and
control circuitry configured to:
generate for presentation a media asset for a first user in a first physical environment;
collect data from the sensor circuitry representing a location of the first user;
process the collected data to determine the location of the first user has changed from the first physical environment to a second physical environment indicating that the first user has left the first physical environment and has entered the second physical environment; and
in response to determining that the location of the first user has changed:
identify a playback position of the media asset that was generated for presentation when the first user left the first physical environment;
determine an attribute of the second physical environment;
determine an environment type of the second physical environment;
determine a plurality of candidate roles associated with the environment type;
determine a first role, of the plurality of candidate roles, of the first user, by:
determining, based on data from the sensor circuitry, that the first user is in a first physical space within the second physical environment;

comparing the first physical space to a plurality of physical space templates, wherein each physical space template is associated with a role of the plurality of candidate roles;

determining, based on the comparing, whether the first physical space matches a first physical space template corresponding to the first role; and in response to determining that the first physical space matches the first physical space template corresponding to the first role, identifying a first plurality of modes of playback associated with the first role;

compare a plurality of versions of the media asset with the identified first plurality of modes to identify a first version of the media asset that corresponds to a first mode; and generate a presentation of the media asset at the second physical environment in the identified first version starting from the identified playback position.

11. The system of claim 10, wherein the control circuitry is further configured to:

detect that a second user is present at the second physical environment with the first user;

determine a second role of the plurality of candidate roles, of the second user, wherein the second role is different from the first role;

identify a second mode of playback that corresponds to the second role, wherein the second mode of playback includes playback using an output that is also used by the first mode and additionally includes an output that is not used by the first mode;

identify a second version of the media asset that corresponds to the second mode; and generate a presentation of the media asset at the second physical environment to the second user using the output that is not used by the first mode from the identified playback position.

12. The system of claim 10, wherein the control circuitry is further configured to:

retrieve a priority level associated with each of the identified modes;

determine that the first version of the media asset corresponds to the first mode and that a second version of the media asset corresponds to a second mode; and select the first version as the identified version in response to determining that a priority level associated with the first mode is greater than a priority level associated with the second mode.

13. The system of claim 10, wherein the first mode presents content using a single device configured to output audio only, wherein a second mode of the modes presents content using multiple types of devices simultaneously, and wherein the control circuitry is further configured, when generating for presentation the media asset in the second physical environment, to generate a display of the media asset on a display device and output audio of the media asset via a separate audio output device.

14. The system of claim 10, wherein the control circuitry is further configured, when determining the attribute of the second physical environment, to:

receive user input classifying the second physical environment;

identify a social occasion at the second physical environment, wherein the social occasion represents an activity that the user is participating in; and identify a plurality of devices associated with the social occasion that are available at the second physical environment.

15. The system of claim 10, wherein the control circuitry is further configured, when determining the attribute of the second physical environment, to:

detect a second user in the second physical environment;

access a viewing history of the second user; and in response to determining that the second user has not viewed the media asset based on the viewing history:

identify a first device that is not perceptible to the second user; and generate the presentation of the media asset on the first device.

16. The system of claim 15, wherein the control circuitry is further configured to:

determine, while the media asset is presented on the first device, that the second user has reached a current playback position in the media asset; and in response to determining that the second user has reached the current play position in the media asset being presented:

identify a second device that is perceptible to the first user and the second user; and generate the presentation of the media asset on the second device.

17. The system of claim 16, wherein the control circuitry is further configured to generate the presentation of the media asset on the second device by changing the identified version from the first version of the media asset that corresponds to the first mode associated with the first device, to a second version of the media asset that corresponds to a second mode associated with the second device.

18. The system of claim 10, wherein the control circuitry is further configured to:

retrieve a social interaction level associated with each of the identified modes;

determine that the first version of the media asset corresponds to the first mode and that a second version of the media asset corresponds to a second mode; and select the first version as the identified version in response to determining that the social interaction level associated with the first mode is greater than the social interaction level associated with the second mode.

* * * * *